US012143323B2

(12) United States Patent
Sevindik

(10) Patent No.: US 12,143,323 B2
(45) Date of Patent: Nov. 12, 2024

(54) METHODS AND APPARATUS FOR USING SOUNDING REFERENCE SIGNALS IN A MIMO SYSTEM TO INCREASE CHANNEL DIVERSITY

(71) Applicant: Charter Communications Operating, LLC, St. Louis, MO (US)

(72) Inventor: Volkan Sevindik, Parker, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 424 days.

(21) Appl. No.: 17/404,791

(22) Filed: Aug. 17, 2021

(65) Prior Publication Data

US 2023/0057805 A1  Feb. 23, 2023

(51) Int. Cl.
*H04B 7/0413* (2017.01)
*H04B 7/06* (2006.01)
*H04L 5/00* (2006.01)

(52) U.S. Cl.
CPC ......... *H04L 5/0048* (2013.01); *H04B 7/0413* (2013.01); *H04B 7/0626* (2013.01)

(58) Field of Classification Search
CPC ........ H04B 7/0413–0473; H04B 7/0491–0695
See application file for complete search history.

(56) References Cited

U.S. PATENT DOCUMENTS

| | | | |
|---|---|---|---|
| 2014/0177490 A1* | 6/2014 | Sahara | H04L 5/0044 370/280 |
| 2021/0136566 A1* | 5/2021 | Manolakos | H04B 7/0623 |
| 2022/0302969 A1* | 9/2022 | Fan | H04B 7/063 |

* cited by examiner

*Primary Examiner* — Michael Thier
*Assistant Examiner* — Prince A Mensah
(74) *Attorney, Agent, or Firm* — Straub & Straub; Michael P. Straub; Stephen T. Straub

(57) ABSTRACT

Methods and apparatus for increasing channel diversity in a MIMO system, e.g. a massive MIMO system, are described. Some selected sounding reference signal values are applied to control base station transmission for antennas, e.g., randomly or semi-randomly selected antennas, to which they do not actually correspond. The wireless terminal perceives this change as a change in channel conditions, which is subsequently reported in channel status information (CSI) to the base station. This results in increased channel diversity, which is beneficial to the base station scheduler.

20 Claims, 26 Drawing Sheets

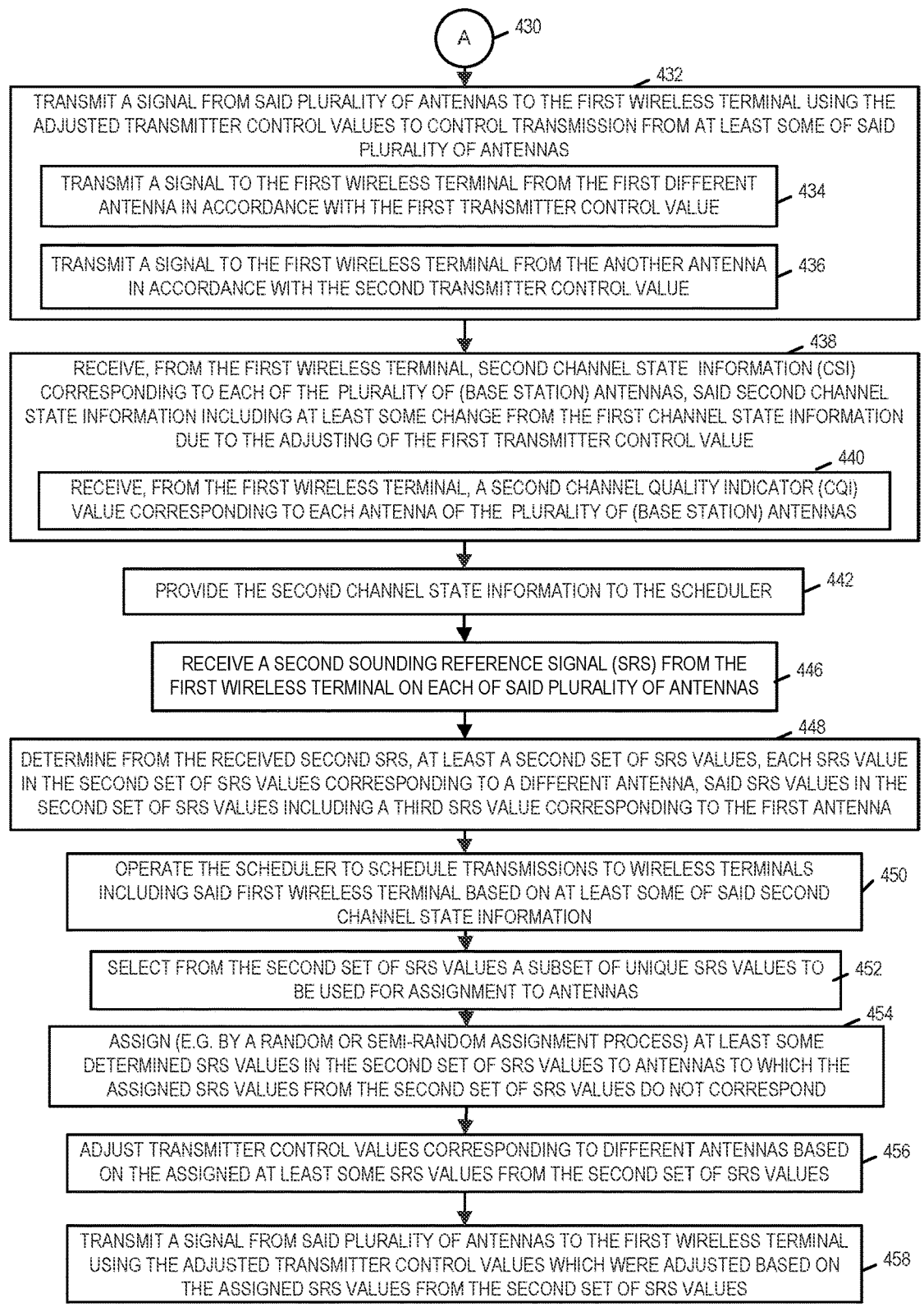

603

ASSEMBLY OF COMPONENTS
INCLUDED IN A BASE STATION, E.G. A CBSD (PART B)

632 — COMPONENT CONFIGURED TO OPERATE THE BASE STATION TO TRANSMIT A SIGNAL FROM SAID PLURALITY OF ANTENNAS TO THE FIRST WIRELESS TERMINAL USING THE ADJUSTED TRANSMITTER CONTROL VALUES TO CONTROL TRANSMISSION FROM AT LEAST SOME OF SAID PLURALITY OF ANTENNAS

634 — COMPONENT CONFIGURED TO OPERATE THE BASE STATION TO TRANSMIT A SIGNAL TO THE FIRST WIRELESS TERMINAL FROM THE FIRST DIFFERENT ANTENNA IN ACCORDANCE WITH THE FIRST TRANSMITTER CONTROL VALUE

636 — COMPONENT CONFIGURED TO OPERATE THE BASE STATION TO TRANSMIT A SIGNAL TO THE FIRST WIRELESS TERMINAL FROM THE ANOTHER ANTENNA IN ACCORDANCE WITH THE SECOND TRANSMITTER CONTROL VALUE

638 — COMPONENT CONFIGURED TO OPERATE THE BASE STATION TO RECEIVE, FROM THE FIRST WIRELESS TERMINAL, SECOND CHANNEL STATE INFORMATION (CSI) CORRESPONDING TO EACH OF THE PLURALITY OF (BASE STATION) ANTENNAS, SAID SECOND CHANNEL STATE INFORMATION INCLUDING AT LEAST SOME CHANGE FROM THE FIRST CHANNEL STATE INFORMATION DUE TO THE ADJUSTING OF THE FIRST TRANSMITTER CONTROL VALUE

640 — COMPONENT CONFIGURED TO OPERATE THE BASE STATION TO RECEIVE, FROM THE FIRST WIRELESS TERMINAL, A SECOND CHANNEL QUALITY INDICATOR (CQI) VALUE CORRESPONDING TO EACH ANTENNA OF THE PLURALITY OF (BASE STATION) ANTENNAS

642 — COMPONENT CONFIGURED TO PROVIDE THE SECOND CHANNEL STATE INFORMATION TO A SCHEDULER

646 — COMPONENT CONFIGURED TO OPERATE THE BASE STATION TO RECEIVE A SECOND SOUNDING REFERENCE SIGNAL (SRS) FROM THE FIRST WIRELESS TERMINAL ON EACH OF SAID PLURALITY OF ANTENNAS

648 — COMPONENT CONFIGURED TO DETERMINE FROM THE RECEIVED SECOND SRS, AT LEAST A SECOND SET OF SRS VALUES, EACH SRS VALUE IN THE SECOND SET OF SRS VALUES CORRESPONDING TO A DIFFERENT ANTENNA, SAID SRS VALUES IN THE SECOND SET OF SRS VALUES INCLUDING A THIRD SRS VALUE CORRESPONDING TO THE FIRST ANTENNA

650 — COMPONENT CONFIGURED TO OPERATE THE SCHEDULER TO SCHEDULE TRANSMISSIONS TO WIRELESS TERMINALS INCLUDING SAID FIRST WIRELESS TERMINAL BASED ON AT LEAST SOME OF SAID SECOND CHANNEL STATE INFORMATION

652 — COMPONENT CONFIGURED TO SELECT FROM THE SECOND SET OF SRS VALUES A SUBSET OF UNIQUE SRS VALUES TO BE USED FOR ASSIGNMENT TO ANTENNAS

654 — COMPONENT CONFIGURED TO ASSIGN (E.G. BY A RANDOM OR SEMI-RANDOM ASSIGNMENT PROCESS) AT LEAST SOME DETERMINED SRS VALUES IN THE SECOND SET OF SRS VALUES TO ANTENNAS TO WHICH THE ASSIGNED SRS VALUES FROM THE SECOND SET OF SRS VALUES DO NOT CORRESPOND

656 — COMPONENT CONFIGURED TO ADJUST TRANSMITTER CONTROL VALUES CORRESPONDING TO DIFFERENT ANTENNAS BASED ON THE ASSIGNED AT LEAST SOME SRS VALUES FROM THE SECOND SET OF SRS VALUES

658 — COMPONENT CONFIGURED TO OPERATE THE BASE STATION TO TRANSMIT A SIGNAL FROM SAID PLURALITY OF ANTENNAS TO THE FIRST WIRELESS TERMINAL USING THE ADJUSTED TRANSMITTER CONTROL VALUES WHICH WERE ADJUSTED BASED ON THE ASSIGNED SRS VALUES FROM THE SECOND SET OF SRS VALUES

FIGURE 5B

| FIGURE 5A | FIGURE 5B |

FIGURE 5

METHODS AND APPARATUS FOR USING SOUNDING REFERENCE SIGNALS IN A MIMO SYSTEM TO INCREASE CHANNEL DIVERSITY

FIELD

The present application relates to wireless communications and more particularly to methods and apparatus for using sounding reference signal information in a MIMO (Multiple Input Multiple Output) system, e.g., a massive MIMO system.

BACKGROUND

One of the main features that 5G system has is the massive MIMO feature which involves use of a large number of antennas to transmit data to a single user. Massive MIMO is used to increase throughput and reliability of the channel in 5G systems. However, increasing the number of antennas creates a new issue sometimes referred to as the channel hardening problem.

In a normal MIMO system, where we have 2 or 4 antennas on the base station, the channel between base station antenna and the user terminal antenna experiences different channel conditions over time. This is known as fading. Because of channel fading in the wireless channel, each user terminal will likely experience different channel conditions when signals are coming from 2 or 4 antennas. In the case of 4 or fewer antennas the sum of signals received using different antennas will still show the fading impact. As a result, in systems using a low number of antennas, e.g., 4 or less, different users will experience different channel conditions at different times. The difference in channel conditions experienced by different users can be taken into consideration when scheduling users. Thus, the difference in channel conditions experienced by different users is useful to a packet scheduler when scheduling different users to transmit at different user data rates and/or with channel condition information being taken into consideration as a ranging metric when ranking users for transmission scheduling purposes.

Unfortunately, when a large number of antennas is used and the signals from different antennas summed, the fading impact tends to be less than when a relatively small number of antennas is used. For example, when the signal, which is transmitted from 100 different antennas reaches a user terminal and is summed up, the fading impact becomes small. In such a case, different user terminals are likely to experience similar channel conditions depriving a scheduler of the channel diversity between users that is normally attributable to fading as something than can be used to facilitate scheduling of users. This can lead to every user terminal in the network seeming to have the same channel conditions, which causes the scheduler to have all its users having the same decision metric or the same rank to receive data making it difficult to select an order. This is problematic since the scheduler needs to schedule data to each user terminal, with user terminals being served sequentially based on the scheduler determined order.

In view of the above it should be appreciated that it would be advantages if methods and/or apparatus could be developed which could be used in a MIMO system, e.g., a massive MIMO system, to improve channel diversity and/or diversity in channel fading experienced by different wireless devices in a manner that the channel and/or fading diversity would change over time and the changing channel conditions could be used by a transmission scheduler used to schedule transmissions to different wireless devices. In this way, the scheduler could decide based on channel and/or fading conditions experienced by the different devices over time which wireless device to transmit to at a given time.

In view of the above, it should be appreciated that there is a need for methods and/or apparatus which can be used to model and/or predict wireless traffic in one or more geographic areas. It would be desirable if the methods and/or apparatus could use a variety of different data traffic sources in making the model and/or if the methods or apparatus could take into consideration the fact that data and/or location reporting periods may be different. Accordingly, it should be appreciated that traffic modeling methods that can be used to facilitate efficient hardware deployment of access points, e.g., base stations, and/or other network elements are both important and useful.

SUMMARY

Methods and apparatus and apparatus for using sounding reference signals (SRS) in a MIMO system, e.g., a massive MIMO system are described.

In accordance with one feature of the invention sounding reference signal (SRS) information is used to increase channel diversity e.g., fading diversity, experienced by user devices using different channels. This diversity can be, and sometimes is, used to facilitate scheduling of data transmissions, e.g., from a base station such as a Citizens Broadband Radio Services Service (CBSD) base station to wireless devices being served by the base station.

In at least some embodiments at least some SRS values (determined based on received and measured SRS) are assigned to antennas to which the SRS values do not correspond. By changing the SRS correspondence artificially, for at least some of the SRS values, the transmitter control values used for controlling transmissions from corresponding antenna elements will also be changed since the transmitter control values, e.g., gain and phase values used for individual antenna elements are based on the SRS values which are considered to correspond to the antenna elements. By modifying through the SRS assignment process which SRS values will be used for transmitter control from antenna elements to which the assigned SRS value did not correspond prior to the assignment, changes in transmitter operation will be introduced which will be perceived by the device receiving the transmitted signals as changes in channel conditions. Thus, by changing the SRS to antenna element correspondence, artificial changes in channel conditions will be perceived and reported back in the channel state information reported by a receiving wireless terminal. These artificially introduced channel variations can then be used by a scheduler in the base station, alone or along with information about the detected or assigned SRS values, to be used by the scheduler in determining when transmissions are to be made to particular wireless terminals being served by the base station.

Thus, the problem of channel hardening is addressed by introducing artificial channel variations through the assignment of SRS values to antenna elements to which the SRS values do not actually correspond.

To prevent changes in SRS values that may be too extreme or affect different antenna elements that are encountering similar channel conditions differently, assignment of SRS values may be to different antenna elements of the same type as the type of antenna to which a determined SRS value actually corresponds. In this way the SRS value which is assigned will be a realistic value for the type of antenna to which the assignment is made. In some cases, a first type of antenna is a vertically polarized antenna and a second type of antenna is a horizontally polarized antenna. Such horizontally and vertical antennas are sometimes referred to as polarized antenna elements.

In some embodiments SRS values which are replaced by the assignment process are limited to a fraction of the total set of SRS values, e.g., half or less, of the full set of SRS values. In this way very drastic changes are avoided, e.g., with many of the transmitter control elements being left unaffected by the SRS reassignment process.

Selection of which SRS values are used as part of the reassignment process is sometimes based on the how many times a particular SRS value appears in the set of received SRS values. By reassigning SRS values which occur multiple times to different antennas, changes can be introduced while making sure that the SRS value being used in the reassignment is not too far off from a reasonable value as indicated by the occurrence of the SRS value multiple times in the set of SRS values.

Since the SRS values being assigned are from a set of determined SRS values they are expected to be within a reasonable range of the actual SRS values being replaced by the assignment process and thus are not likely to degrade the channel to such an extent that the SRS value reassignment process will drastically impair communications performance and, in fact, will provide the benefit of some variation in perceived and reported channel state.

An exemplary method of operating a base station, in accordance with some embodiments comprises: receiving a first Sounding Reference Signal (SRS) from a first wireless terminal on each of a plurality of antennas; determining, at the base station, from the received first SRS, at least a first set of SRS values, each SRS value in the first set of SRS values corresponding to a different antenna, said SRS values including a first SRS value corresponding to a first antenna; assigning at least some determined SRS values to antennas to which the assigned SRS values do not correspond; adjusting transmitter control values corresponding to different antennas based on the assigned SRS values; and transmitting a signal from said plurality of antennas to the first wireless terminal using the adjusted transmitter control values to control transmission from at least some of said plurality of antennas.

Numerous variations on the described methods and apparatus are possible and while several embodiments are described in detail is should be appreciated that the full set of detailed steps need not be used in all embodiments with many of the features and determinations being useful even if not used with the other features and steps.

The detailed description which follows describes additional features, details and embodiments which can be used alone or in combination.

BRIEF DESCRIPTION OF THE FIGURES

FIG. 2 comprises the combination of FIG. 2A, FIG. 2B, FIG. 2C, FIG. 2D and FIG. 2E.

FIG. 3B is a second part of a flowchart of an exemplary method of operating a base station, e.g., a CBSD base station, in accordance with an exemplary embodiment.

FIG. 3 comprises the combination of FIG. 3A and FIG. 3B.

FIG. 5 comprises the combination of FIG. 5A and FIG. 5B.

DETAILED DESCRIPTION

Figure 1:
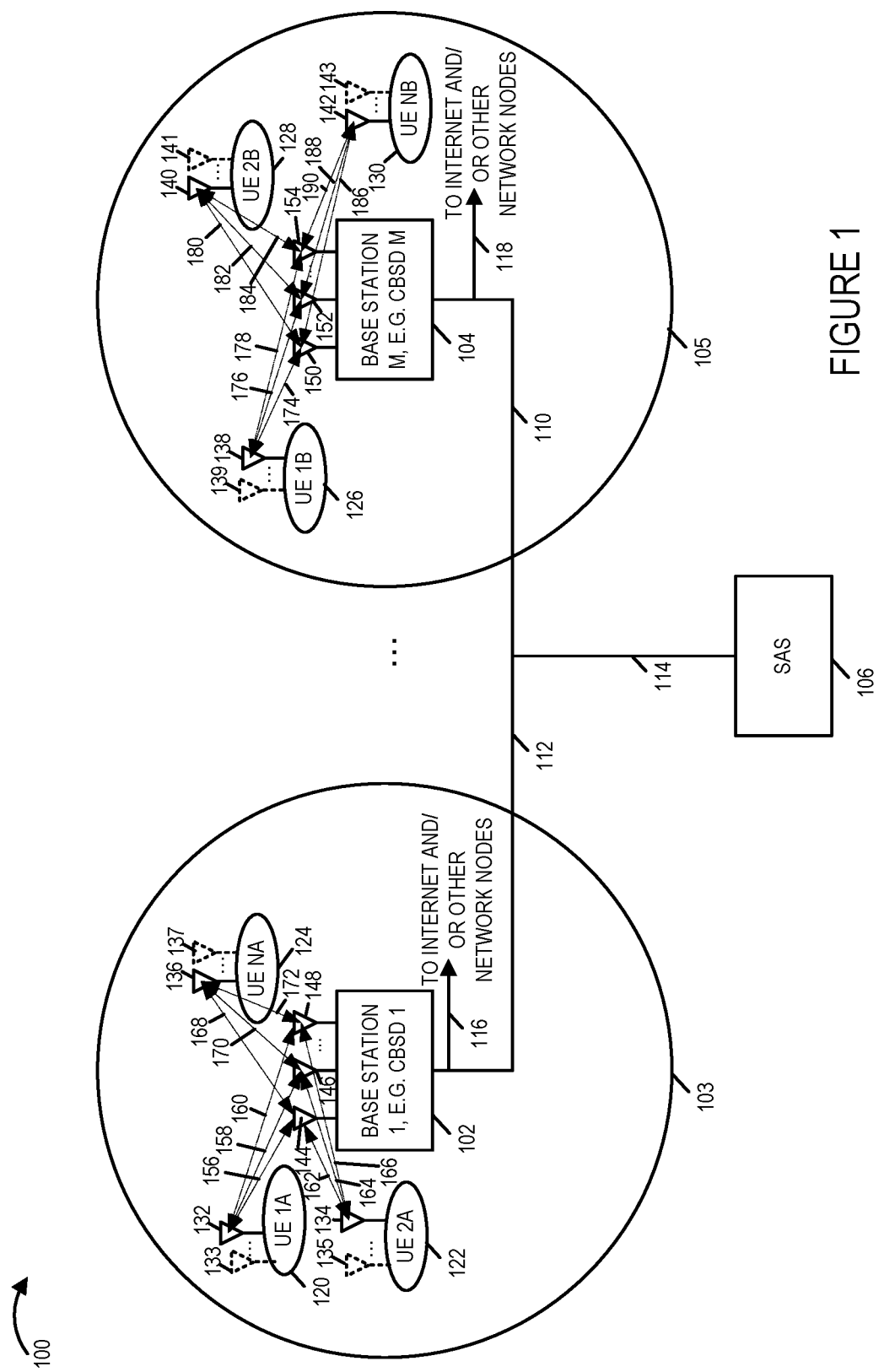
FIG. 1 is a drawing of an exemplary communications system in accordance with an exemplary embodiment.
Figure 2A:
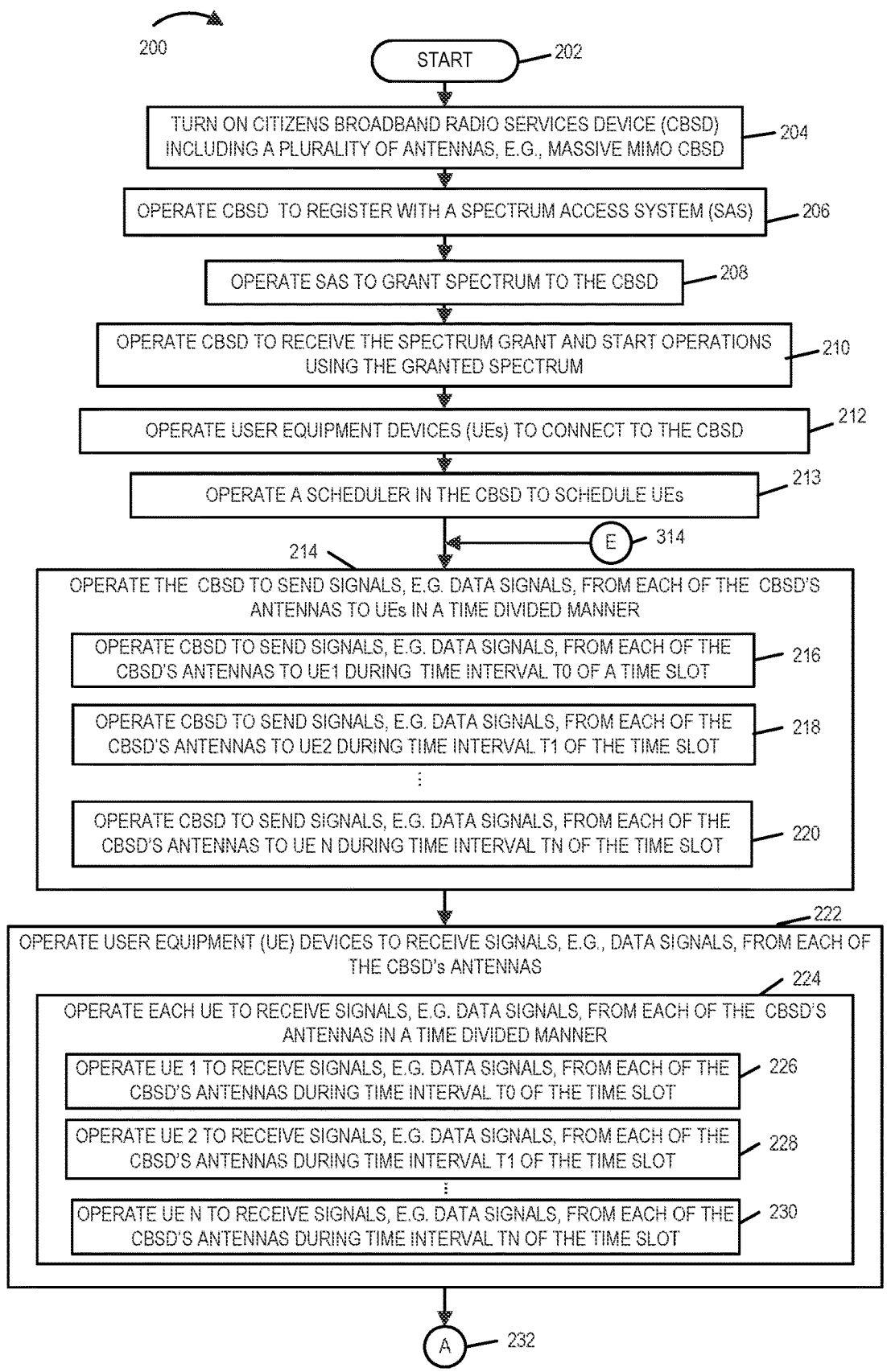
FIG. 2A is a first part of a flowchart of an exemplary method of operating a communications system in accordance with an exemplary embodiment.
Figure 2B:
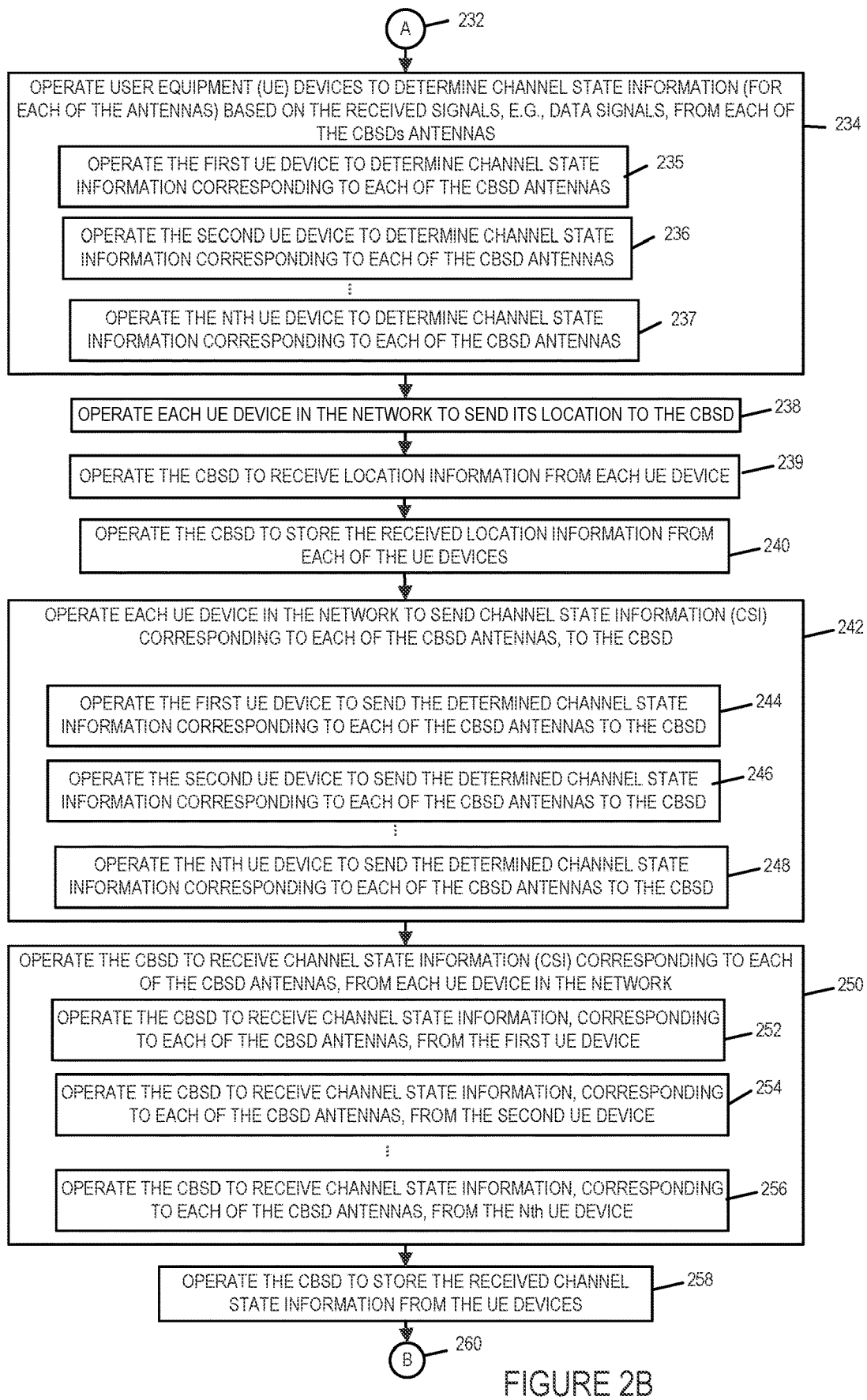
FIG. 2B is a second part of a flowchart of an exemplary method of operating a communications system in accordance with an exemplary embodiment.
Figure 2C:
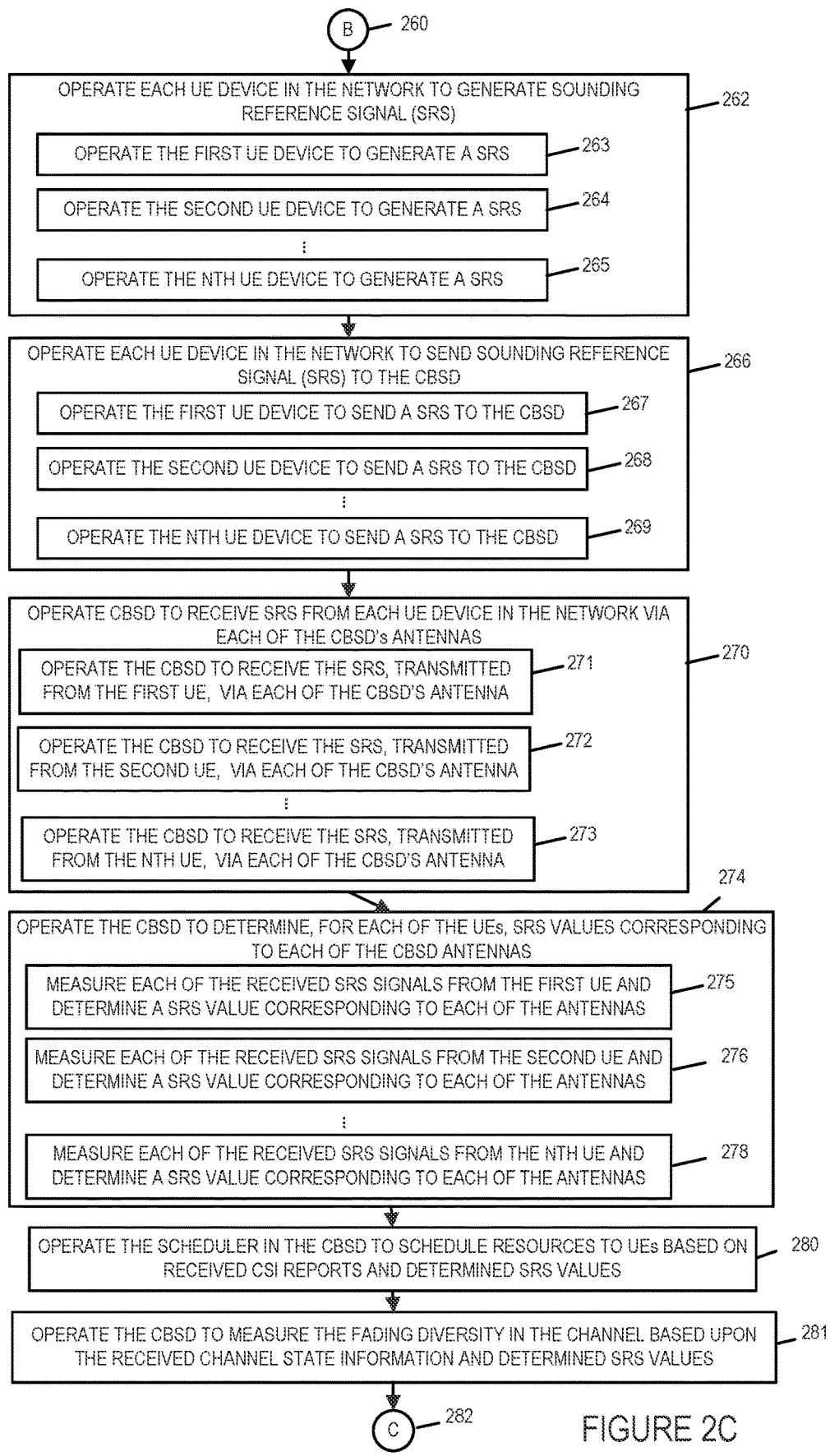
FIG. 2C is a third part of a flowchart of an exemplary method of operating a communications system in accordance with an exemplary embodiment.
Figure 2D:
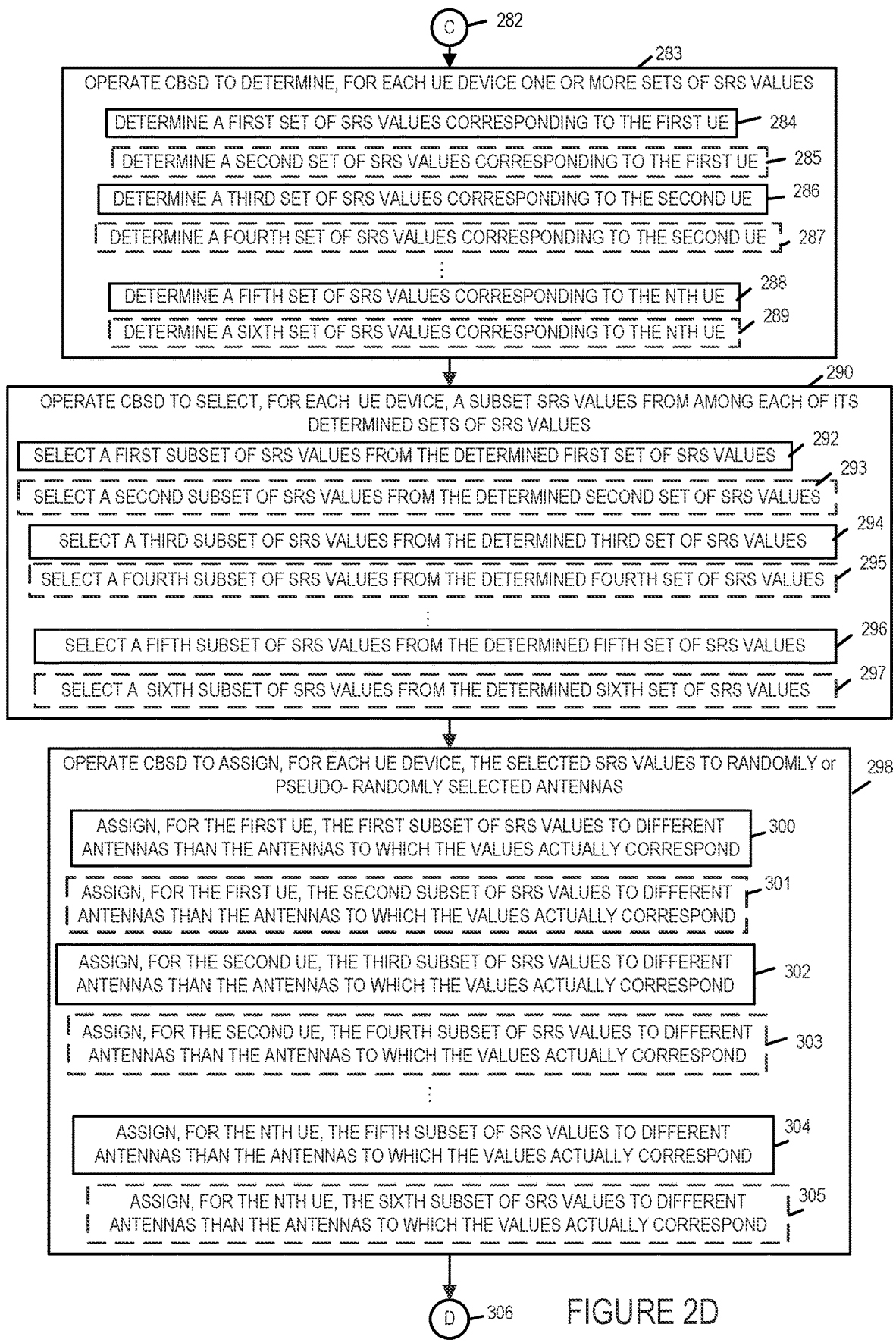
FIG. 2D is a fourth part of a flowchart of an exemplary method of operating a communications system in accordance with an exemplary embodiment.
Figure 2E:
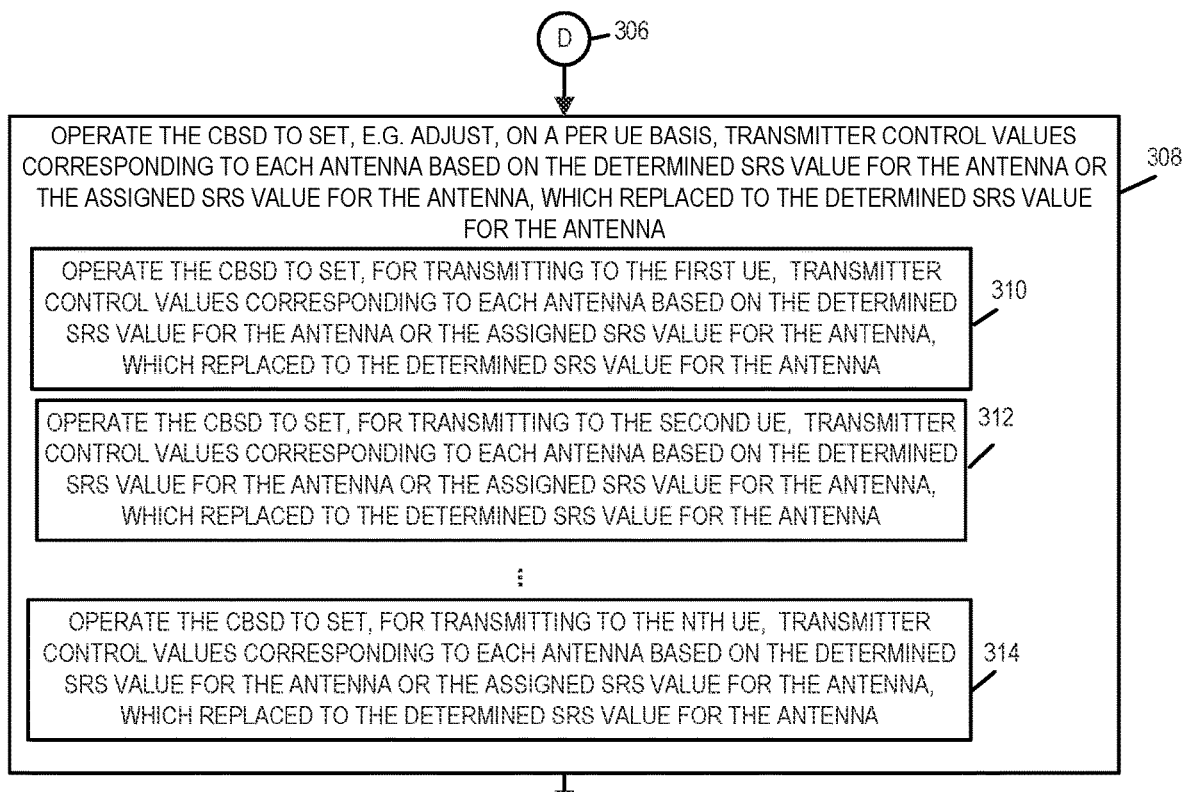
FIG. 2E is a fifth part of a flowchart of an exemplary method of operating a communications system in accordance with an exemplary embodiment.

FIG. 1 is a drawing of an exemplary communications system 100 in accordance with an exemplary embodiment. Exemplary system 100 includes a plurality of base stations (base station 1 102, e.g., CBSD 1, . . . , base station M 104, e.g., CBSD M) with corresponding wireless coverage areas (103, . . . , 105), respectively, a spectrum access system (SAS) 106 and a plurality of wireless terminals (user equipment 1A (UE 1A) 120, UE 2A 122, . . . , UE NA 124, UE 1B 126, UE 2B 128, . . . , UE NB 130). At least some of the UEs are mobile devices which may be move throughout the communications system 100 and be connected to different base stations at different times. Base station 1 102, e.g., CBSD 1, is coupled to SAS 106 via communications links 112, 114. Base station 1 102 is also coupled to the Internet and/or other network nodes via communications link 116. Base station M 104, e.g., CBSD M, is coupled to SAS 106 via communications links 110, 114. Base station M 104 is also coupled to the Internet and/or other network nodes via communications link 118.

Base station 1 102 supports massive MIMO and includes a plurality of antennas antenna 1 144, antenna 2 146, . . . , antenna n 148. Base station M 104 also supports massive MIMO and includes a plurality of antennas antenna 1 150, antenna 2 152, . . . , antenna n 154. In some embodiments, N is a large number, e.g., N=64, N=128, N=100, N=200, N=256, N=512, etc. In some embodiments, some, e.g., half, of each base stations (102, . . . , 104) antennas are vertical polarization antennas and some, e.g., half, of each base stations (102, . . . , 104) antennas are horizontal polarization antennas. In some embodiments, a set of antennas corresponding to a base station (102, 104) form an antenna array.

Each of the UEs (UE 1A 120, UE 2A 122, . . . , UE NA 124, UE 1B 126, UE 2B 138, . . . , UE NB 130) includes a first antenna (132, 134, . . . , 136, 138, 140, . . . , 142), respectively. In some embodiments each of the UEs (UE 1A 120, UE 2A 122, . . . , UE NA 124, UE 1B 126, UE 2B 138, . . . , UE NB 130) further includes a second antenna (133, 135, . . . , 137, 139, 141, . . . , 143), respectively.

Bi-directional arrows (156, 158, 160) indicate wireless links between antenna 132 of UE 1A 120 and antennas (144, 146, 148) of base station 1 102, respectively. Bi-directional arrows (162, 164, 166) indicate wireless links between antenna 134 of UE 2A 122 and antennas (144, 146, 148) of base station 1 102, respectively. Bi-directional arrows (168, 170, 172) indicate wireless links between antenna 136 of UE NA 124 and antennas (144, 146, 148) of base station 1 102, respectively.

Bi-directional arrows (174, 176, 178) indicate wireless links between antenna 138 of UE 1B 138 and antennas (150, 152, 154) of base station M 104, respectively. Bi-directional arrows (180, 182, 184) indicate wireless links between antenna 140 of UE 2B 128 and antennas (150, 152, 154) of base station M 104, respectively. Bi-directional arrows (186, 188, 190) indicate wireless links between antenna 142 of UE NB 130 and antennas (150, 152, 154) of base station M 104, respectively.

SAS 106 allocates spectrum to the base stations 102, . . . , 104. For example, SAS 106 grants a block of unlicensed spectrum, for a particular duration of time, to CBSD base station 102 in response to a request for spectrum.

Base stations (102, . . . , 104) receives channel status information (CSI) reports, e.g., from UEs being served, for each base station antenna being used to communicate with the UE. For example, base station 102 may, and sometimes does, receive reported CSI information, e.g., a reported channel quality indicator (CQI) value, corresponding to each of base station 1 102 antennas (144, 146, . . . , 148) from UE 1A 120. Each UE also sends a sounding reference signal (SRS) to the base station to which it is connected, which is received via each of the base stations antennas. For example, UE 1A generates and sends a SRS to BS 1 102 which is received via antennas (144, 146, . . . , 148). The base station determines a SRS value corresponding to each of the antennas based on the measured received SRS signal. For example, BS 1 102 determines an SRS value corresponding to each of antennas (144, 146, . . . , 148). Typically, the determined SRS values are used to control subsequent base station transmitter settings, e.g., gain and/or phase settings.

In accordance with a feature of some embodiments, some, e.g., a few, of the determined SRS values are selected and assigned, e.g., in a random or pseudo-random manner, to different antennas, e.g., antennas to which the SRS value did not correspond. This approach of intentional transmission disruption for some randomly or pseudo-randomly selected transmitter channels, results in beneficial diversity between the different UEs being served by the base station and is useful to remediate the problem of channel hardening in massive MIMO systems.

FIG. 2, comprising the combination of FIG. 2A, FIG. 2B, FIG. 2C, FIG. 2D and FIG. 2E, is a flowchart 200 of an exemplary method of operating a communication system, e.g., communications system 100, in accordance with an exemplary embodiment. Operation starts in step 202, in which an SAS, e.g., SAS 106 of FIG. 1, is powered on and initialized. Operation proceeds from system initialization step 202 to step 204. In step 204 a Citizens Broadband Radio Services Device (CBSD) including a plurality of antennas, e.g., CBSD 1 102 of FIG. 1 which is a massive MIMO CBSD, is turned-on. Operation proceeds from step 204 to step 206.

In step 206 the CBSD registers with a Spectrum Access System, e.g. SAS 106. For example, the CBSD sends a registration request to the SAS. Operation proceeds from step 206 to step 208. In step 208 the SAS grants spectrum to the CBSD, e.g., the SAS decides to grant a block of unlicensed spectrum to the CBSD for a specified time duration, and sends a response message to the CBSD indicating the spectrum grant. Operation proceeds from step 208 to step 210. In step 210 the CBSD receives the spectrum grant and starts operations using the granted spectrum, operations include transmitting broadcast signals identifying the CBSD, the spectrum, and a timing frequency structure in use. Operation proceeds from step 210 to step 212.

In step 212 user equipment devices (UEs), e.g., UE 1A 120, UE 2A 122, and UE NA 124, are operated to connect to the CBSD. Operation proceeds from step 212 to step 213. In step 213 a scheduler in the CBS Dos operated to schedule the UEs, e.g., schedule downlink and uplink air link resources to the UEs. Operation proceeds from step 213 to step 214.

In step 214 the CBSD is operated to send signals, e.g., data signals, from each of the CBSDs antennas to UEs in a time divided manner. Step 214 includes steps 216, 218 and 220. In step 216 the CBSD sends signals, e.g., data signals, from each of the CBSDs antennas (e.g., antennas 144, 146, ..., 148) to UE 1, e.g., UE 1A 120, during time interval TO of a time slot. In step 218 the CBSD sends signals, e.g., data signals, from each of the CBSDs antennas to UE 2, e.g. UE 2A 122, during time interval T2 of the time slot. In step 220 the CBSD sends signals, e.g., data signals, from each of the CBSDs antennas to UE N, e.g. UE 2A 122, during time interval TN of the time slot. Operation proceeds from step 214 to step 222.

In step 222, the UE devices are operated to receive signals, e.g., data signals, from each of the CBSDs antennas. Step 222 includes step 224. In step 224 each UE is operated to receives signals, e.g. data signals, form each of the CBSDs antennas in a time divided manner. Step 224 includes steps 226, 228 and 230. In step 226 UE 1 receives signals, e.g., data signals, from of the CBSD's antennas during time interval TO of the time slot. In step 228 UE 2 receives signals, e.g. data signals, from of the CBSD's antennas during time interval T1 of the time slot. In step 230 UE N receives signals, e.g. data signals, from of the CBSD's antennas during time interval TN of the time slot. Operation proceeds from step 222, via connecting node A 232, to step 234.

In step 234 the UE devices are operated to determine channel state information (for each of the antennas) based on the received signals, e.g., data signals, from each of the CBSDs antennas. Step 234 includes steps 235, 236 and 237. In step 235 the first UE device determines channel state information corresponding to each of the CBSDs antennas. In step 236 the second UE device determines channel state information corresponding to each of the CBSDs antennas. In step 237 the Nth UE device determines channel state information corresponding to each of the CBSDs antennas. Operation proceeds from step 234 to step 238.

In step 238 each UE device in the network, e.g. UE 1A, UE 2A, . . . , UENA, sends its location to the CBSD. Operation proceeds from step 238 to step 239. In step 239 the CBSD receives location information from each UE device. Operation proceeds from step 239 to step 240. In step 240 the CBSD stores the received location information from each of the UE devices. Operation proceeds from step 240 to step 242.

In step 242 each UE device in the network is operated to send channel state information (CSI) corresponding to each of the CBSDs antennas, to the CBSD. Step 242 includes steps 244, 246 and 248. In step 244 the first UE device sends its determined channel state information, corresponding to each of the CBSD antennas, to the CBSD. In step 246 the second UE device sends its determined channel state information, corresponding to each of the CBSD antennas, to the CBSD. In step 248 the first UE device sends its determined channel state information, corresponding to each of the CBSD antennas, to the CBSD. Operation proceeds from step 242 to step 250.

In step 250 the CBSD is operated to receive channel state information (CSI) corresponding to each of the CBSD antennas, from each UE device in the network. Step 250 includes steps 252, 254 and 256. In step 252 the CBSD is operated to receive channel state information, corresponding to each of the CBSD antennas, from the first UE device. In step 254 the CBSD is operated to receive channel state information, corresponding to each of the CBSD antennas, from the second UE device. In step 256 the CBSD is operated to receive channel state information, corresponding to each if the CBSD antennas, from the Nth UE device. Operation proceeds from step 250 to step 258. In step 258 the CBSD is operated to store the received channel state information form the UE devices. Operation proceeds from step 250, via connecting node B 206, to step 262.

In step 262 each UE device in the network is operated to generate sounding reference signal (SRS). Step 262 includes steps 263, 264 and 265. In step 263 the first UE device generates a SRS. In step 264 the second UE device generates a SRS. In step 265 the Nth UE device generates a SRS. Operation proceeds from step 262 to step 266.

In step 266 each UE device in the network is operated to send SRS to the CBSD, Step 266 includes steps 267, 268 and 269. In step 267 the first UE devices sends a SRS to the CBSD. In step 268 the second UE devices sends a SRS to the CBSD. In step 269 the Nth UE devices sends a SRS to the CBSD. Operation proceeds from step 266 to step 270.

In step 270 the CBSD receives SRS from each UE device in the network via each of the CBSD's antennas. Step 270 includes steps 271, 272 and 273. In step 271 the CBSD is operated to receive the SRS, transmitted from the first UE, via each of the CBSD's antennas. In step 272 the CBSD is operated to receive the SRS, transmitted from the second UE, via each of the CBSD's antennas. In step 273 the CBSD is operated to receive the SRS, transmitted from the Nth UE, via each of the CBSD's antennas. Operation proceeds from step 270 to step 274.

In step 274 the CBSD determines, for each of the UEs, SRS values corresponding to each of the CBSD antennas. Step 274 includes steps 275, 276 and 278. In step 275 the CBSD measures each of the received SRS signals from the first UE and determines a SRS value corresponding to each of its antennas. In step 276 the CBSD measures each of the received SRS signals from the second UE and determines a SRS value corresponding to each of its antennas. In step 278 the CBSD measures each of the received SRS signals from the Nth UE and determines a SRS value corresponding to each of its antennas. Operation proceeds from step 274 to step 280.

In step 280 a scheduler in the CBSD is operated to schedule resources to the UEs based on the received CSI reports and determined SRS values. Operation proceeds from step 280 to step 281. In step 281 the CBSD is operated to measure the fading diversity in the channel based upon the received channel state information and determined SRS values. Operation proceeds from step 281, via connecting node C 282, to step 283.

In step 283 the CBSD determines for each UE device, one or more sets of SRS values. Step 283 includes steps 284, 286 and 288. In some embodiments, e.g., some embodiments in which the CBSD includes both vertical polarization antennas and horizontal polarization antennas, step 283 includes optional steps 285, 287 and 289.

In step 284 the CBSD determines a first set of SRS values corresponding to the first UE device. In step 285 the CBSD determines a second set of SRS values corresponding to the first UE device. In step 286 the CBSD determines a third set of SRS values corresponding to the second UE device. In step 287 the CBSD determines a fourth set of SRS values corresponding to the second UE device. In step 288 the CBSD determines a fifth set of SRS values corresponding to the Nth UE device. In step 289 the CBSD determines a sixth set of SRS values corresponding to the Nth UE device. Operation proceeds from step 283 to step 290.

In step 290 the CBSD selects, for each UE device, a subset of SRS value for among each of its determined sets of SRS values. Step 290 includes steps 292, 294 and 296. In some embodiments, e.g., some embodiments in which the CBSD includes both vertical polarization antennas and horizontal polarization antennas, step 290 includes optional steps 293, 295 and 297. In step 292 the CBSD selects a first subset of SRS values from the determined first set of SRS values. In step 293 the CBSD selects a second subset of SRS values from the determined second set of SRS values. In step 294 the CBSD selects a third subset of SRS values from the determined third set of SRS values. In step 295 the CBSD selects a fourth subset of SRS values from the determined fourth set of SRS values. In step 296 the CBSD selects a fifth subset of SRS values from the determined fifth set of SRS values. In step 297 the CBSD selects a sixth subset of SRS values from the determined sixth set of SRS values. Operation proceeds from step 290 to step 298.

In step 298 the CBSD assigns, for each UE device, the selected SRS values to randomly or pseudo-randomly selected antennas. Step 299 includes steps 300, 302 and 304. In some embodiments, e.g., some embodiments in which the CBSD includes both vertical polarization antennas and horizontal polarization antennas, step 298 includes optional steps 301, 303 and 305. In step 300 the CBSD assigns, for the first UE, the first subset of SRS values to different antennas than the antennas to which the values actually correspond. In step 301 the CBSD assigns, for the first UE, the second subset of SRS values to different antennas than the antennas to which the values actually correspond. In step 302 the CBSD assigns, for the second UE, the third subset of SRS values to different antennas than the antennas to which the values actually correspond. In step 303 the CBSD assigns, for the second UE, the fourth subset of SRS values to different antennas than the antennas to which the values actually correspond. In step 304 the CBSD assigns, for the Nth UE, the fifth subset of SRS values to different antennas than the antennas to which the values actually correspond. In step 305 the CBSD assigns, for the Nth UE, the sixth subset of SRS values to different antennas than the antennas to which the values actually correspond. Operation proceeds from step 298, via connecting node D 306 to step 308.

In step 306 the CBSD sets, e.g., adjusts, on a per UE basis, transmitter control values corresponding to each antenna based on the determined SRS value for the antenna or the assigned value for the antenna, which replaced the determined SRS value for the antenna. Step 208 includes steps 310, 312 and 314. In step 310 the CBSD sets, for transmitting to the first UE, transmitter control values corresponding to each antenna based on the determined SRS value for the antenna or the assigned value of the antenna, which replaced the determined SRS value for the antenna. In step 312 the CBSD sets, for transmitting to the second UE, transmitter control values corresponding to each antenna based on the determined SRS value for the antenna or the assigned value of the antenna, which replaced the determined SRS value for the antenna. In step 314 the CBSD sets, for transmitting to the Nth UE, transmitter control values corresponding to each antenna based on the determined SRS value for the antenna or the assigned value of the antenna, which replaced the determined SRS value for the antenna. Operation proceeds from step 308, via connecting node E 314 to step 214, in which the CBSD sends, e.g., transmits, signal, e.g., data signals from each of the CBSDs antenna to UEs in a time divided manner using the transmitter settings of step 308.

Figure 3A:
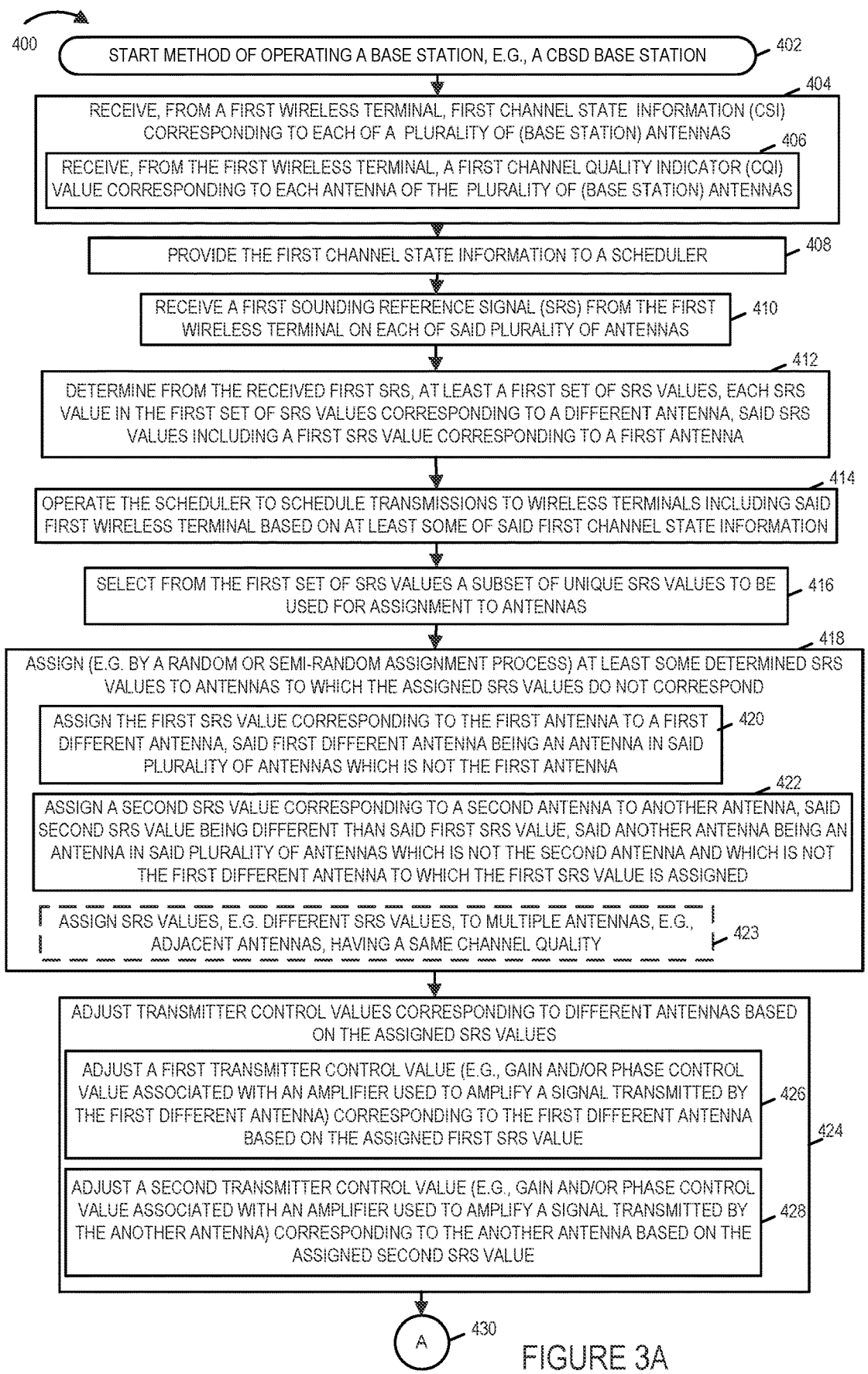
FIG. 3A is a first part of a flowchart of an exemplary method of operating a base station, e.g., a CBSD base station, in accordance with an exemplary embodiment.

FIG. 3, comprising the combination of FIG. 3A and FIG. 3B, is a flowchart 400 of an exemplary method of operating a base station, e.g., a CBSD base station in accordance with an exemplary embodiment. The exemplary base station implementing the method of flowchart 400 is, e.g., one of the base stations 103, 105 of system 100 of FIG. 1. Operation starts in step 402, in which the base station, e.g., base station 1 102, is powered on and initialized. Operation proceeds from start step 402 to step 404. In step 404, the base station receives, from a first wireless terminal, e.g., UE 1A 120, first channel state information (CSI) corresponding to each of a plurality of (base station) antennas. Step 404 includes step 406, in which the base station receives from the first wireless terminal, a first channel quality indicator (CQI) value corresponding to each (base station) antenna of the plurality of (base station) antennas. Thus, in step 406 a set of CQI values are received, one CQI value for each antenna in the plurality of antennas. Operation proceeds from step 404 to step 408.

In step 408 the base station provider the first channel state information to a scheduler, e.g., a scheduler included as part of the base station. Operation proceeds from step 408 to step 410.

In step 410 the base station receives a first sounding reference signal (SRS) from the first wireless terminal (e.g., a UE device being served by the base station) on each of said plurality of antennas. Operation proceeds from step 410 to step 412.

In step 412 the base station determines from the received first SRS, at least a first set off SRS values, each SRS value in the first set of SRS values corresponding to a different antenna, said SRS values including a first SRS value corresponding to the first antenna. Operation proceeds from step 412 to step 414.

In step 414 the scheduler is operated to schedule transmissions to wireless terminals included said first wireless terminal based on at least some of said first channel state information. In some embodiments, the scheduler also uses the determined SRS values (from step 412) in addition the first channel state information in making scheduling decisions. Operation proceeds from step 414 to step 416.

In step 416 the base station selects from the first set of SRS values a subset of unique SRS values to be used for assignment to antennas. Operation proceeds from step 416 to step 418.

In step 418 the base station assigns (e.g., by a random or semi-random assignment process) at least some of the determined SRS values to antennas to which the assigned SRS values do not correspond.

In some embodiments, some of the antennas to which different SRS values are assigned have the same channel quality. In some embodiments, assigning at least some determined SRS values to antennas to which the assigned SRS values do not correspond results in replacement of a fraction of the SRS values corresponding to antennas in said first set of SRS values. In some such embodiments, said fraction is less than half of the antennas in said plurality of antennas.

Step 418 includes step 420 and step 422. In some embodiments, step 418 includes optional step 423. In step 420 the base station assigns the first SRS value corresponding to the first antenna to a first different antenna, said first different antenna being an antenna in said plurality of antennas which is not the first antenna. In step 422 the base station assigns a second SRS value corresponding to a second antenna to another antenna, said another antenna being an antenna in said plurality of antennas which is not the second antenna and which is not the first different antenna to which the first SRS value is assigned. In step 423 the base station assigns values, e.g., different SRS values, to multiple antennas, e.g. adjacent multiple antennas, having the same channel quality, e.g., as indicated by reported channel quality indicators (CQIs).

In some embodiments, said first different antenna and said another antenna had the same channel quality (e.g. as indicated by the reported CQIs) prior to said step of assigning at least some determined SRS values to antennas to which the assigned SRS values do not correspond. In some embodiments, the first different antenna and the another antenna are part of the same row or same column in an antenna array. In some such embodiments, the first different antenna and said another antenna are adjacent antennas.

In some embodiments first SRS value is an SRS value which occurs multiple times in said first set of SRS values; and the second SRS value is an SRS value which also occurs multiple times in said first set of SRS values.

In some embodiments, the first SRS value corresponds to a first type of antenna (e.g., a vertically polarized or horizontally polarized antenna); and the first different antenna is of the same antenna type as the first antenna. In some such embodiments, the first type antenna is a vertically polarized antenna.

In some embodiments, the second SRS value corresponds to a second type of antenna (e.g., a vertically polarized or horizontally polarized antenna); and the another antenna is of the same antenna type as the second antenna. In some such embodiments, the second type of antenna is a horizontally polarized antenna.

Operation proceeds from step 418 to step 424. In step 424 the base station adjusts transmitter control values corresponding to different antennas based on the assigned SRS values. Step 424 includes steps 426 and 428. In step 426 the base station adjusts a first transmitter control value (e.g., a gain and/or phase control value associated with an amplifier used to amplifier a signal transmitted by the first different antenna) corresponding to the first different antennas based on the assigned first SRS value. In step 428 the base station adjusts a second transmitter control value (e.g., a gain and/or phase control value associated with an amplifier used to amplifier a signal transmitted by the another antenna) corresponding to the another antennas based on the assigned second SRS value. Operation proceeds from step 424, via connecting node A 430, to step 432.

In step 432 the base station transmits a signal for said plurality of antennas to the first wireless terminal using the adjusted transmitter control values to control transmission from at least some of said plurality of antennas. Step 432 includes step 434 and step 436. In step 434 the base station transmits a signal to the first wireless terminal from the first different antenna in accordance with the first transmitter control value. In step 436 the base station transmits a signal to the first wireless terminal from the another antenna in accordance with the second transmitter control value. Operation proceeds from step 432 to step 438.

In step 438 the base station receives, from the first wireless terminal, second channel state information (CSI) corresponding to each of the plurality of (base station) antennas, said second channel state information included at least some change from the first channel state information due to the adjusting of the first transmitter control value. Step 438 includes step 440. In step 440 the base station receives from the first wireless terminal, a second channel quality indicator (CQI) value corresponding to each (base station) antenna of the plurality of (base station) antennas. Thus, in step 440 a set of CQI values are received, one CQI value for each antenna in the plurality of antennas. Operation proceeds from step 438 to step 442.

In step 442 the base station provider the second channel state information to the scheduler. Operation proceeds from strep 442 to step 446.

In step 446 the base station receives a second sounding reference signal (SRS) from the wireless terminal on each of said plurality of antennas. Operation proceeds from step 446 to step 448.

In step 448 the base station determines from the received second SRS, at least a second set of SRS values, each SRS value in the second set of SRS values corresponding to a different antenna, said SRS value in the second set of SRS values including a third SRS value corresponding to the first antenna. Operation proceeds from step 448 to step 450.

In step 450 the base station operates the scheduler to schedule transmission to wireless terminals including the first wireless terminal based on at least some of said channel state information. In some embodiments, the scheduler also uses the determined SRS values (from step 448) in addition the second channel state information in making scheduling decisions. Operation proceeds from step 450 to step 452.

In step 452 the base station selects from the second set of SRS values a subset of unique SRS values to be used for assignment to antennas. Operation proceeds from step 452 to step 454.

In step 454 the base station assigns (e.g., by a random or semi-random assignment process) at least some determined SRS values in the second set of SRS values to antennas to which the assigned SRS values from the second set of SRS values do not correspond. Operation proceeds from step 454 to step 456.

In step 456 the first base station adjusts transmitter control values corresponding to different antennas based on the assigned at least some SRS values from the second set of SRS values. Operation proceeds from step 456 to step 458.

In step 458 the bae station transmits a signal from sad plurality of antennas to the first wireless terminal using the adjusted transmitter control values which were adjusted based on the assigned SRS values from the second set of SRS values, e.g., with the assigned values controlling transmission from at least some of the plurality of antennas.

Figure 4:
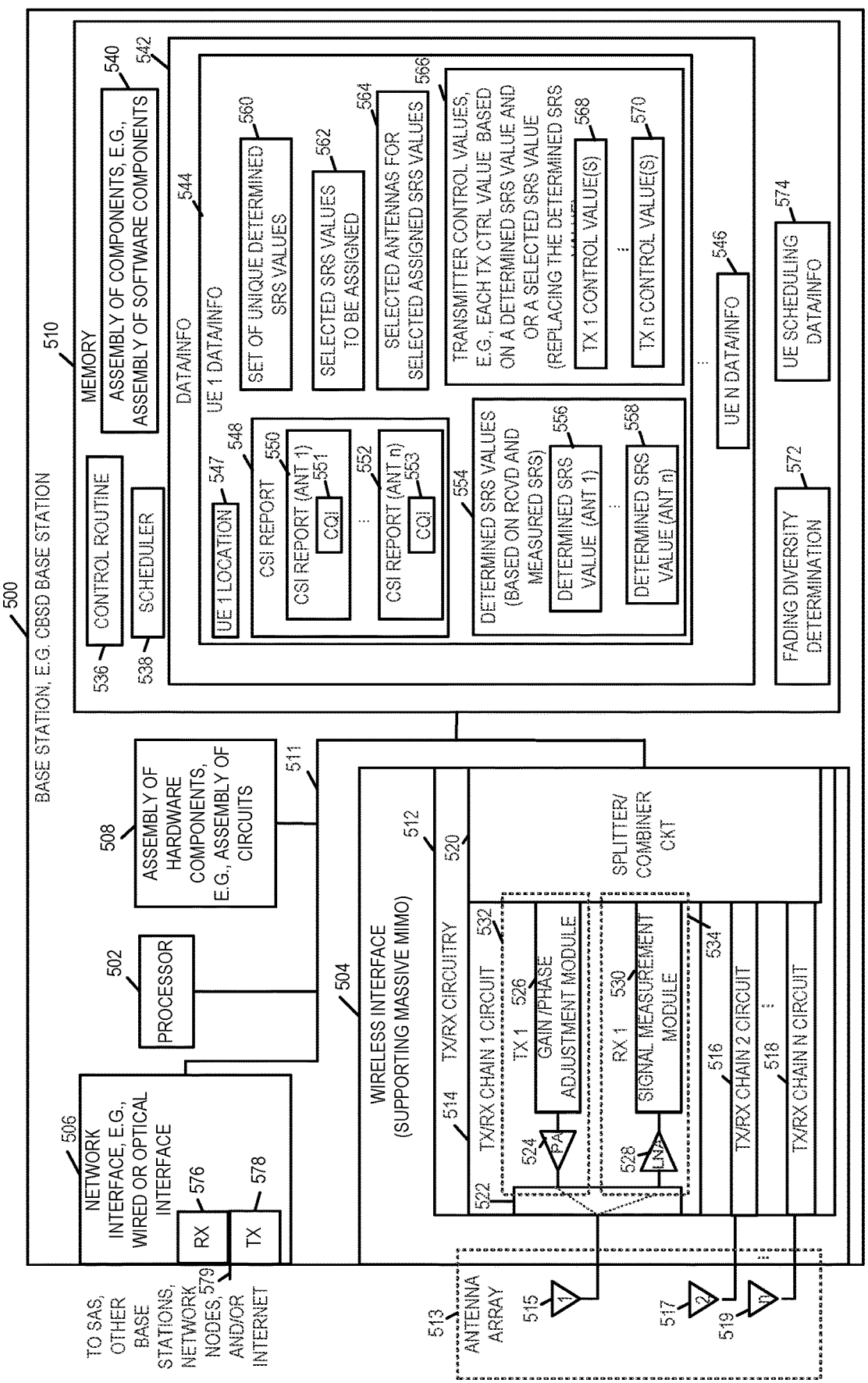
FIG. 4 is a drawing of an exemplary base station, e.g., a CBSD base station, in accordance with an exemplary embodiment.

FIG. 4 is a drawing of an exemplary base station 500, e.g., a Citizens Broadband Radio Services Device (CBSD), in accordance with an exemplary embodiment. Exemplary base station 500 is, e.g., one of the base stations (base station 1 502, . . . , base station M 504) of FIG. 1, CBSD 700 of FIGS. 6-13, CBSD 1402 of FIGS. 14-17, CBSD 2002 of FIG. 20, a base station implementing steps of the method of flowchart 200 of FIG. 2 and/or a base station implementing the steps of the method of flowchart 400 of FIG. 3.

Base station 500 includes a processor 502, e.g., a CPU, a wireless interface 504, a network interface 506, an assembly of hardware components 508, e.g., an assembly of circuits, memory 510 and a bus 511 via which the various elements are coupled together. Network interface 506, e.g., a wired or optical interface includes a receiver (RX) 576 and a transmitter 578. Network interface 506 couples the base station, via its network interface connector 579 and one or more communications links, e.g., backhaul links, to a spectrum access system (SAS), other base stations, network nodes, e.g., core network nodes, routers, etc., and/or the Internet.

Wireless interface 504, which supports massive MIMO, includes TX/RX circuitry 512 and a plurality of antennas (antenna 1 515, antenna 2 517, ..., antenna n 519) coupled together. TX/RX circuitry 512 includes a plurality of TX/RX chains (TX/RX chain 1 circuit 514, TX/RX chain circuit 516, TX/RX chain N circuit 518), which are coupled to splitter/combiner circuit 520. TX/RX chain 1 circuit 514 includes a TX/RX switching circuit 522, wireless transmitter (TX) 1 532 and wireless receiver (RX) 1 534. TX 1 532 includes a gain/phase adjustment module 526 coupled to power amplifier (PA) 524. RX 1 534 includes a low noise amplifier (LNA) 528 coupled to signal measurement module 530. In some embodiments the antennas (antenna 1 515, antenna 2 517, ..., antenna n 519) are part of an antenna array 513. In some embodiments, the set of antennas (antenna 1 515, antenna 2 517, ..., antenna n 519) includes both vertical polarization antennas and horizontal polarization antennas. The additional TX/RX chains (TX/RX chain 2 circuit 516, ..., TX/RX chain N circuit 518) included in TX/RX circuitry 512 include similar components as the components shown with respect to TX/RX chain 1 514. Received signals received by wireless interface 504 includes signals from wireless terminals, e.g., signals communicating channel status information reports, sounding reference signals, uplink data signals. Transmitted signals transmitted by wireless interface 504 include base station ID signals, reference signals, downlink control signals and downlink traffic signals. Gain phase adjustment module 526 receives and uses transmitter control values, e.g., gain and/or phase control values associated with an amplifier used to amplify a signal to be transmitted. The transmitter control value(s) are, in some embodiments, are set based on a determined SRS (from a received SRS corresponding to the antenna of the chain) and/or an assigned SRS value (determined from a received SRS corresponding to another chain and assigned via a random or pseudo-random assignment process). Signal measurement module 530 measures received SRS signals, e.g., obtaining measurement information used to determine an SRS value.

Memory 510 includes a control routine 536, a scheduler 538, and an assembly of components 540, e.g., an assembly of software components, and data/information 542. The control routine 526 includes, e.g., code which when executed by processor 502, causes the base station to various base station operations, e.g. memory load, memory read, activate and control the interfaces (504, 506) to perform receive and transmit operations in accordance with a frequency/timing structure and/or implemented communications protocols. Scheduler 538 schedules wireless terminals, e.g., assigns DL and UL air link resources to UEs based on UE needs, reported and/or determined channel conditions, received SRS signals, and/or measured fading diversity. The scheduling performed by scheduler 538 may, and sometimes does favor different wireless devices at different times.

Assembly of components 540, e.g., an assembly of software components, includes, e.g., routines, subroutines, application, etc., including code which when executed by a processor, e.g., processor 502, causes the base station 500 to implement steps of an exemplary method, e.g., steps of the method of flowchart 200 of FIG. 2 and/or steps of the method of flowchart 400 of FIG. 3.

Data/information 542 includes data/information corresponding to a plurality of UEs being serviced by the base station (UE 1 data/information 544, UE N data/information 546), fading diversity determination information 572, and UE scheduling data/information 574, e.g., an output of scheduler 538. UE 1 data/information 544 includes channel state information (CSI) report 548, determined SRS values 544 (based on received and measured sounding reference signal (SRS)), a set of unique determined SRS values 560, selected SRS values to be assigned 562, and information 564 identifying selected antennas for selected assigned SRS values, and transmitter control values 566. CSI report 548 includes a CSI report corresponding to each base station antenna used for communications with UE 1 (CSI report (antenna 1) 550 including a channel quality indicator (CQI) value 551, ..., CSI report (antenna n) 552 including a channel quality indicator (CQI) value 553). Determined SRS values 554 includes a determined SRS value corresponding to each base station antenna (determined SRS value based on measurements of the UE 1 transmitted SRS which received via base station antenna 1 556, ..., determined SRS value based on measurements of the UE 1 transmitted SRS which received via base station antenna n 558). Set of unique determined SRS values 560 is a set of unique SRS values from determined SRS values 554. For example, the same SRS value may be, and sometimes is, determined by processing the received SRS signal received via multiple different base station antennas. Selected SRS values to be assigned 562 is a subset of the set of unique determined SRS values 562. Selected antennas for selected assigned SRS values 564 are a randomly, pseudo-randomly or semi-randomly selected subset of the set of base station antennas for which selected SRS values are to be assigned (replacing a determined SRS value for that antenna). Transmitter control values 566 include transmitter control values, e.g., gain and/or phase adjustment values, corresponding to each transmitter chain (TX 1 control value(s) 568, ... TX n control value(s) 570), each transmitter chain associated with a base station antenna. Each transmitter control value is based on a determined SRS value corresponding to the antenna of the chain or a selected SRS value (replacing the determined SRS value corresponding to the antenna of the chain).

Figure 5A:
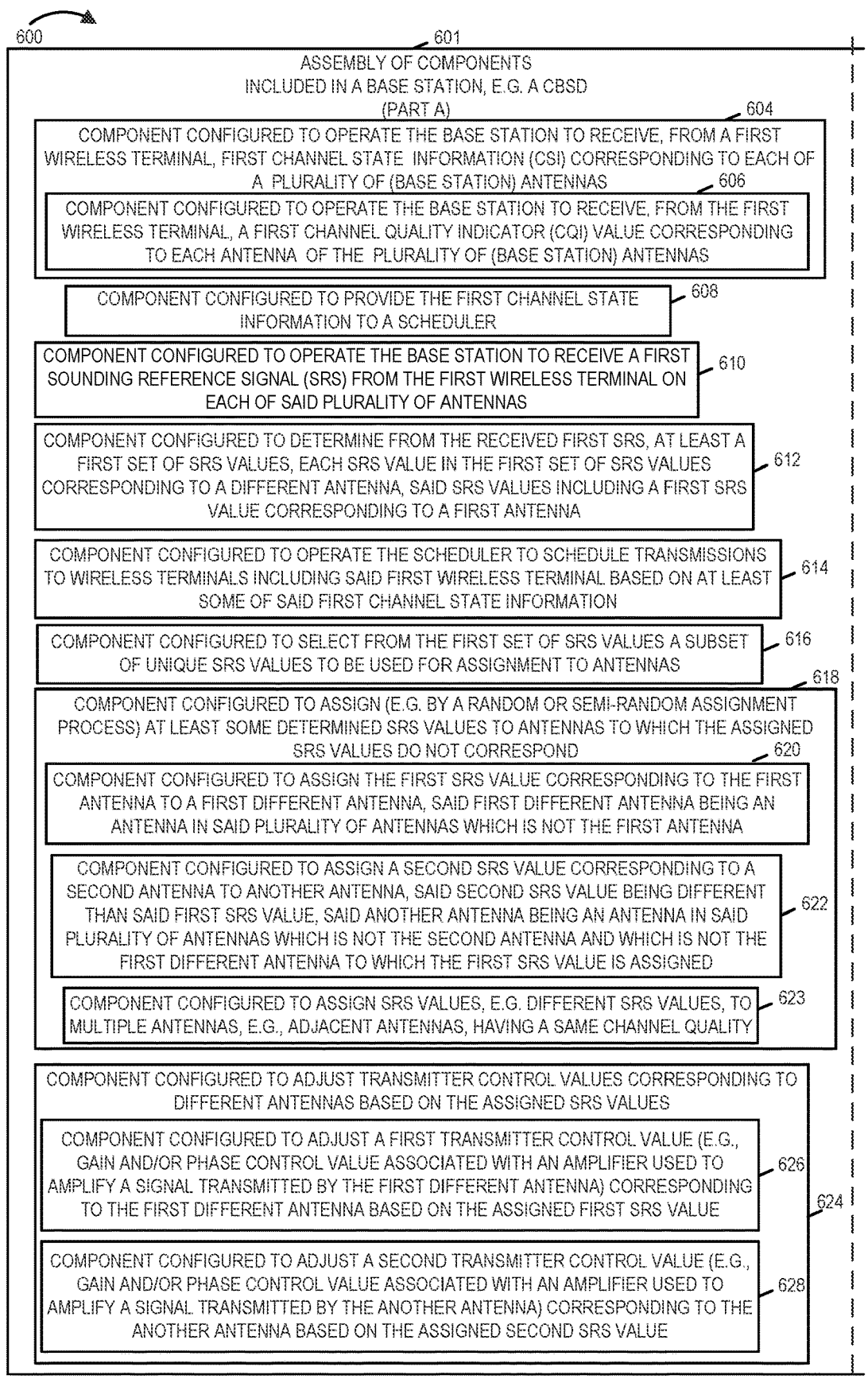
FIG. 5 is a drawing of a first part of an exemplary assembly of components which may be included in an exemplary base station in accordance with an exemplary embodiment.
FIG. 5B is a drawing of a second part of an exemplary assembly of components which may be included in an exemplary base station in accordance with an exemplary embodiment.

FIG. 5, comprising the combination of FIG. 5A and FIG. 5B, is a drawing of an exemplary assembly of components 600, comprising the combination of Part A 601 and Part B 603, which may be included in an exemplary base station, e.g., a CBSD, in accordance with an exemplary embodiment. The exemplary base station including assembly of components 600 is, e.g., any of the base stations (base station 1 102, ..., base station M 104) of system 100 of FIG. 1, base station 500 of FIG. 4, CBSD 700 of FIGS. 6-13, CBSD 1402 of FIG. 14-17, CBSD 2002 of FIG. 20 and/or a base station implementing steps of the exemplary method of flowchart 200 of FIG. 2 and/or steps of the exemplary method of flowchart 400 of FIG. 3.

The components in the assembly of components 600 can, and in some embodiments are, implemented fully in hardware within a processor, e.g., processor 502, e.g., as individual circuits. The components in the assembly of components 600 can, and in some embodiments are, implemented fully in hardware within the assembly of hardware components 508, e.g., as individual circuits corresponding to the different components. In other embodiments some of the components are implemented, e.g., as circuits, within processor 502 with other components being implemented, e.g., as circuits within assembly of components 508, external to and coupled to the processor 502. As should be appreciated the level of integration of components on the processor and/or with some components being external to the processor may be one of design choice. Alternatively, rather than being implemented as circuits, all or some of the components may be implemented in software and stored in the memory 510 of the base station 500, with the components controlling operation of base station 500 to implement the functions corresponding to the components when the components are executed by a processor e.g., processor 502. In some such embodiments, the assembly of components 600 is included in the memory 510 as part of an assembly of software components 540. In still other embodiments, various components in assembly of components 600 are implemented as a combination of hardware and software, e.g., with another circuit external to the processor providing input to the processor which then under software control operates to perform a portion of a component's function.

When implemented in software the components include code, which when executed by a processor, e.g., processor 502, configure the processor to implement the function corresponding to the component. In embodiments where the assembly of components 600 is stored in the memory 510, the memory 510 is a computer program product comprising a computer readable medium comprising code, e.g., individual code for each component, for causing at least one computer, e.g., processor 502, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 5 control and/or configure the base station 500 or elements therein such as the processor 502, to perform the functions of corresponding steps illustrated and/or described in the method of one or more of the flowcharts, signaling diagrams and/or described with respect to any of the Figures. Thus, the assembly of components 600 includes various components that perform functions of corresponding one or more described and/or illustrated steps of an exemplary method, e.g., steps of the method of flowchart 200 of FIG. 2 and/or steps of the method of flowchart 400 of FIG. 3.

Assembly of components 600 includes a component 604 configured to operate the base station to receive, from a first wireless terminal, first channel state information (CSI) corresponding to each of a plurality of (base station) antennas. Component 604 includes a component 606 configured to receive from the first wireless terminal, a first channel quality indicate (CQI) value corresponding to each antenna of the plurality of (base station) antennas.

Assembly of components 600 further includes a component 608 configured to provide the first channel state information to a scheduler, e.g. a scheduler included as part of the base station, a component 610 configured to operate the base station to receive a first sounding reference signal (SRS) from the first wireless terminal on each of said plurality of antennas, a component 612 configured to determine from the received first SRS, at least a first set of SRS values, each SRS value in the first set of SRS values corresponding to a different antenna, said SRS values including a first SRS value corresponding to a first antenna, and a component 614 configured to operate the scheduler to schedule transmissions to wireless terminal including the first wireless terminal based on at least some of said first channel state information. In some embodiments, component 614 is configured to further use information derived from and/or based on received SRS signals, e.g., determined SRS values, in making scheduling decisions.

Assembly of components 600 further includes a component 616 configured to select from the first set of SRS values a subset of unique SRS values to be used for assignment to antennas, and a component 618 configured to assign (e.g., by a random or semi-random assignment process) at least some determined SRS values to antennas to which the assigned STS values do not correspond. Component 618 includes a component 620 configured to assign the first SRS value corresponding to the first antenna to a first different antenna, said first different antenna being an antenna in said plurality of antennas which is not the first antenna, a components 622 configured to assign a second SRS value corresponding to a second antenna to another antenna, said second SRS value being different than said first SRS value, said another antenna being an antenna in said plurality of antennas which is not the second antenna and which is not the first different antenna to which the first SRS value is assigned, and a component 623 configured to assign SRS values, e.g. different SRS values, to multiple antennas, e.g., adjacent antennas, having a same channel quality, e.g. as indicated by reported CQIs.

Assembly of components 600 further includes a component 624 configured to adjust transmitter control values corresponding to different antennas based on the assigned SRS values. Component 624 includes a component 626 configured to adjust a first transmitter control value (e.g., gain and/or phase control value associated with an amplifier used to amplify a signal transmitted by the first different antenna) corresponding to the first different antenna based on the assigned first SRS value, and a component 628 configured to adjust a second transmitter control value (e.g., gain and/or phase control value associated with an amplifier used to amplify a signal transmitted by the another antenna) corresponding to the another antenna based on the assigned second SRS value.

Assembly of components 600 further includes a component 632 configured to operate the base station to transmit a signal from said plurality of antennas to first wireless terminal using the adjusted transmitter control values to control transmission to at lease some of said plurality of antennas. Component 632 includes a component 634 configured to operate the base station to transmit a signal to the first wireless terminal from the first different antenna in accordance with the first transmitter control value and a component 636 configured to operate the base station to transmit a signal to the first wireless terminal from the another antenna in accordance with the second transmitter control value.

Assembly of components 600 further includes a component 638 configured to operate the base station to receive, from the first wireless terminal, a second channel state information (CSI) corresponding to each of the plurality of (base station) antennas, said second channel state information including at least some change from the first channel state information due to the adjusting of the first transmitter control value. Component 638 includes a component 640 configured to operate the base station to receive, from the first wireless terminal, a second channel quality indicator (CAI) value corresponding to each antenna of the plurality of (base station) antennas.

Assembly of components 600 further includes a component 642 configured to provide the second channel state information to the scheduler, a component 646 configured to operate the base station to receive a second sounding reference signal (SRS) from the wireless terminal on each of said plurality of antenna, a component 648 configured to determine from the received second SRS, at least a second set of SRS values, each SRS in the second set of SRS values corresponding to a different antenna, said SRS values in the second set of SRS values including a third SRS value corresponding to the first antenna, and a component 650 configured to operate the scheduler to schedule transmission to wireless terminals including said first wireless terminal based on at least some of said second channel state information. In some embodiments, component 650 is configured to further use information derived from and/or based on received second SRS signals, e.g., determined SRS values, in making scheduling decisions.

Assembly of components 600 further includes a component 652 configured to select from the second set of SRS values a subset of unique SRS values to be used for assignment to antennas, a component 654 configured to assign (e.g., by a random or semi-random assignment process) at least some determined SRS values in the second set of SRS values to antennas to which the assigned SRS values do not correspond, a component 656 configured to adjust transmitter control values corresponding to the different antennas based on the assigned at least some SRS values from the second set of SRS values, and a component 658 configured to operate the base station to transmit a signal for said plurality of antennas to the first wireless terminal using the adjusted transmitter control values which were adjusted based on the assigned SRS values from the second set of SRS values.

Various aspects and/or features of some embodiments of the present invention are described below.

An exemplary flow will now be described. A Citizens Broadband Radio Services Device (CBSD) turns on and registers with a Spectrum Access System (SAS). The SAS grants spectrum to the CBSD. The CBSD has a large number of antennas, e.g., 100-500 antennas, to use for massive MIMO communication. Consider that the exemplary CBSD has 100 antennas. Each user terminal, sometimes referred to as a user equipment (UE), receives data from each of the 100 antennas in time divided manner. For example, UE1 receives data from each of the 100 antennas at time=0, and UE2 receives data from each of the 100 antennas at time=1, and so on.

With a high number of antennas being used for massive MIMO, the same (or similar) RF channel conditions are experienced for each UE in the network.

During connected mode, the CBSD uses each of its antennas to transmit the data to user terminals. That is, each user terminal receives data from each of the antennas.

When in IDLE mode, the CBSD will page the UEs to measure the channel state information from each of the antennas by sending signal from each antenna to each UE in the network. The CBSD will store this information.

In the uplink (UL), UE sends sounding reference signal (SRS) to the CBSD so that the CBSD estimates the channel between itself and UE. SRS information is used in the next transmission by the CBSD so that detrimental impact of channel on the data is removed.

In single antenna system or 2 or 4 antenna MIMO systems, SRS can be used to improve the channel availability, however for massive MIMO systems, it will not work since it removes the diversity in the channel.

Once the CBSD receives SRS information for each of its antennas from each UE, then CBSD will use different SRS information for different antennas. That is, SRS1 that is sent by UE1 for antennal will be used for antenna 10, and SRS50 that is sent by UE1 for antenna 50 is used for antenna 82, and so on. In this way, the CBSD will apply different weights during data transmission to UE1, and these weights are different and almost randomly selected for each antenna from among reported SRS information.

Figure 6:
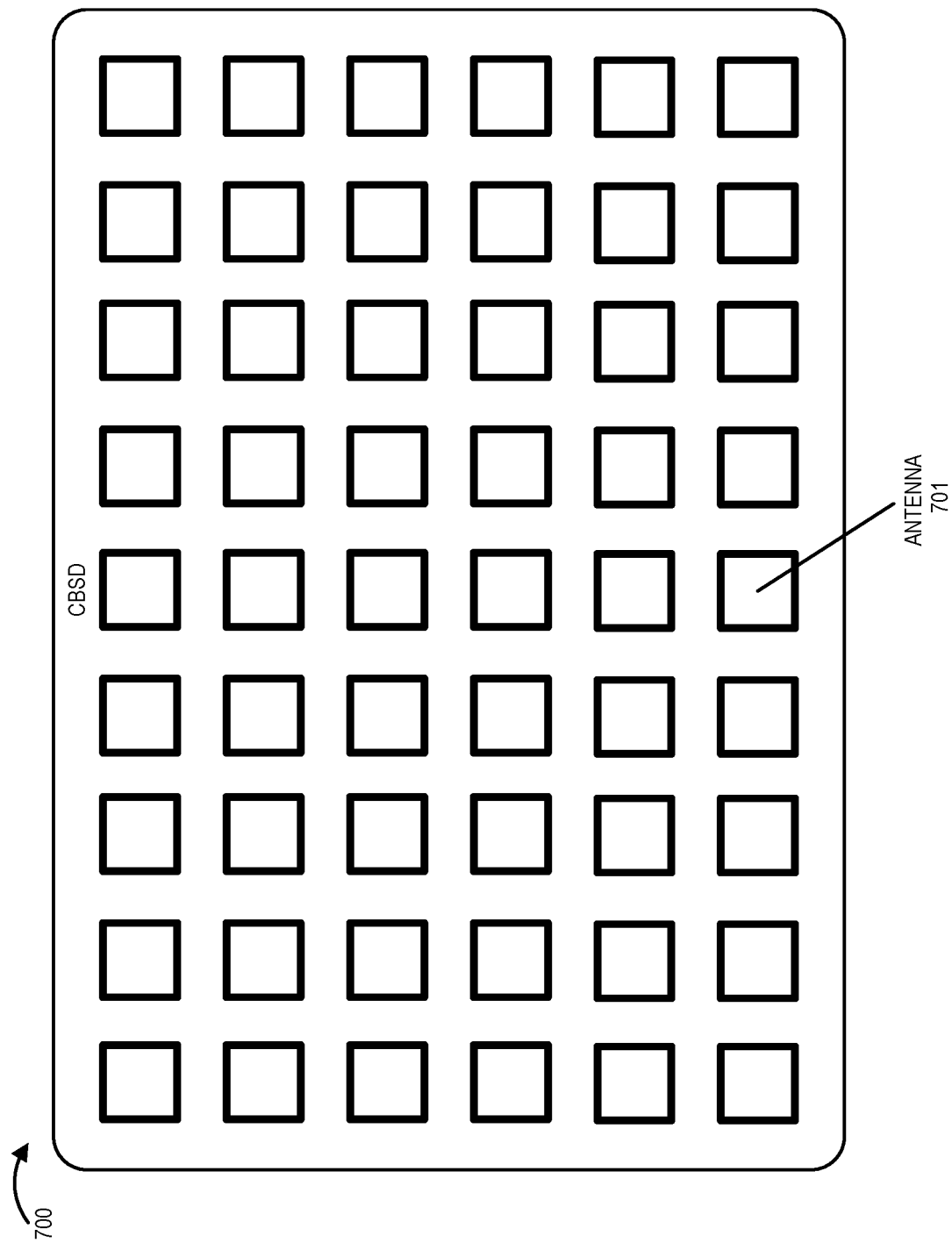
FIG. 6 is a drawing of an exemplary CSBD supporting massive MIMO, said CBSD including a plurality of antennas arranged in an array, in accordance with an exemplary embodiment.

FIG. 6 is a drawing of an exemplary CSBD 700 including a plurality of antennas (e.g., including at least 54 antennas) arranged in an array. Exemplary antenna 701 within CBSD 700 is identified. Exemplary CBSD 700 is, e.g., exemplary base station 500 of FIG. 4.

Figure 7:
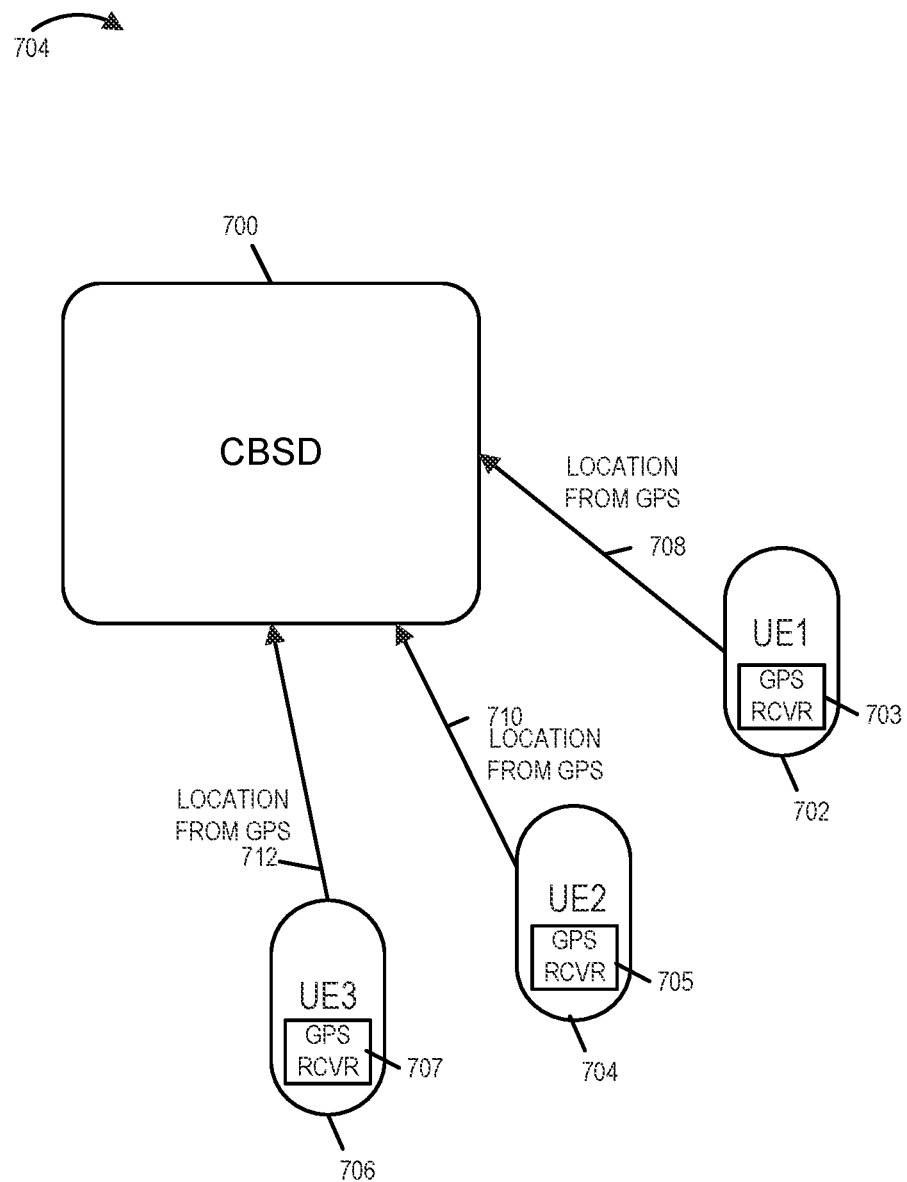
FIG. 7 is a drawing illustrating UEs reporting GPS derived location information to a CBSD.

FIG. 7 is a drawing 704 illustrating exemplary CBSD 700 and three exemplary wireless terminals (UE 1 702, UE 2 704, UE 3 706) which are coupled to CBSD 700 and are being served by CBSD 700. The UEs (702, 704, 706) are, e.g., any of the UEs of system 100 of FIG. 1. Each UE (UE 1 702, UE 2 704, UE 3 706) includes a GPS receives (703, 705, 707) respectively, which receives GPS signals and determines the location of the UE. Each UE (702, 704, 706) determines its location from the received GPS signals and sends its location to the CBSD 700 in a message (708, 710, 712). The CBSD 707 receives the location information from the UEs, and stores the location information, e.g., to be used later in making decisions, e.g., regarding scheduling, assignment of SRS values, handoffs, etc.

Figure 8:
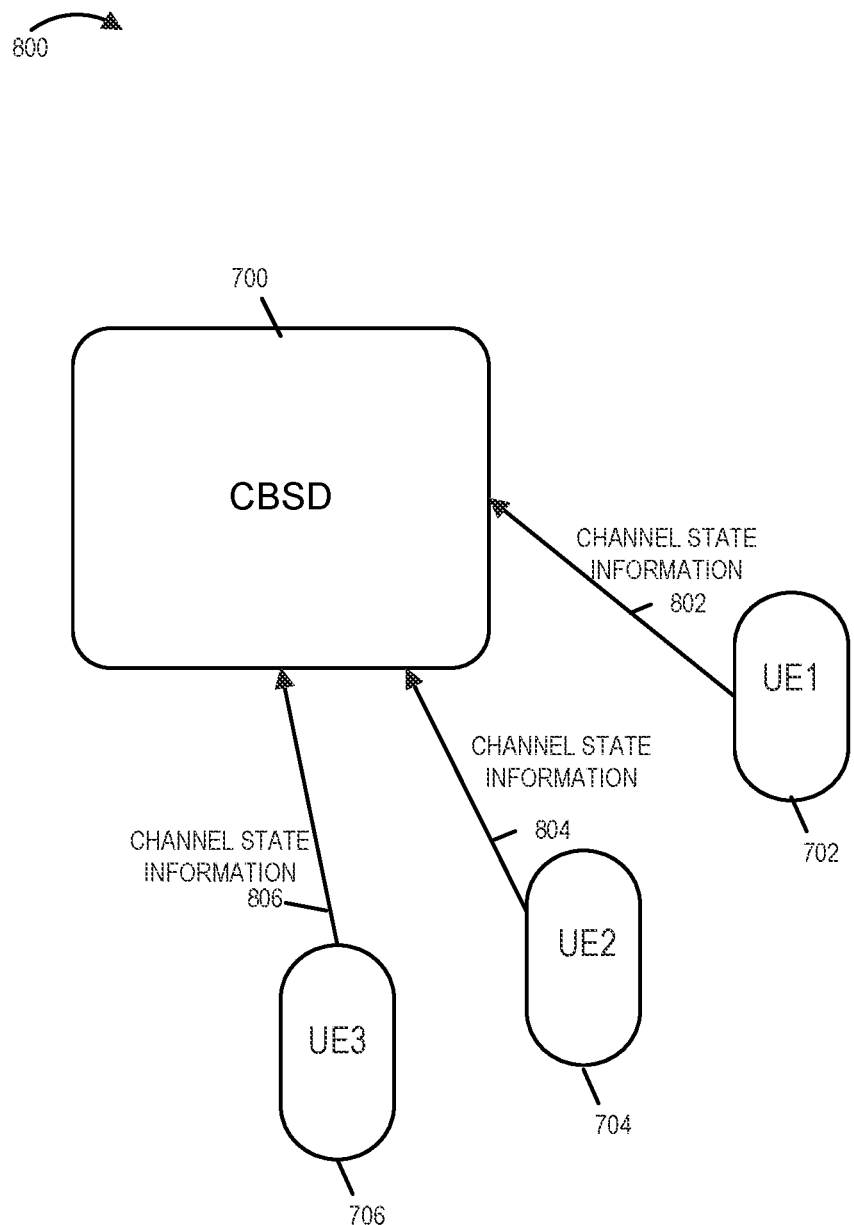
FIG. 8 is a drawing illustrating UEs reporting channel state information (CSI) to a CBSD.

FIG. 8 is a drawing illustrating exemplary CBSD 700 receiving channel state information (802, 804, 806) from UEs (UE 1 702, UE 2 704, UE 3 706), respectively. The received channel state information is received by CBSD and stored and used to make decisions, e.g., including scheduling decisions, assignment of SRS values, handoffs, etc.

Figure 9:
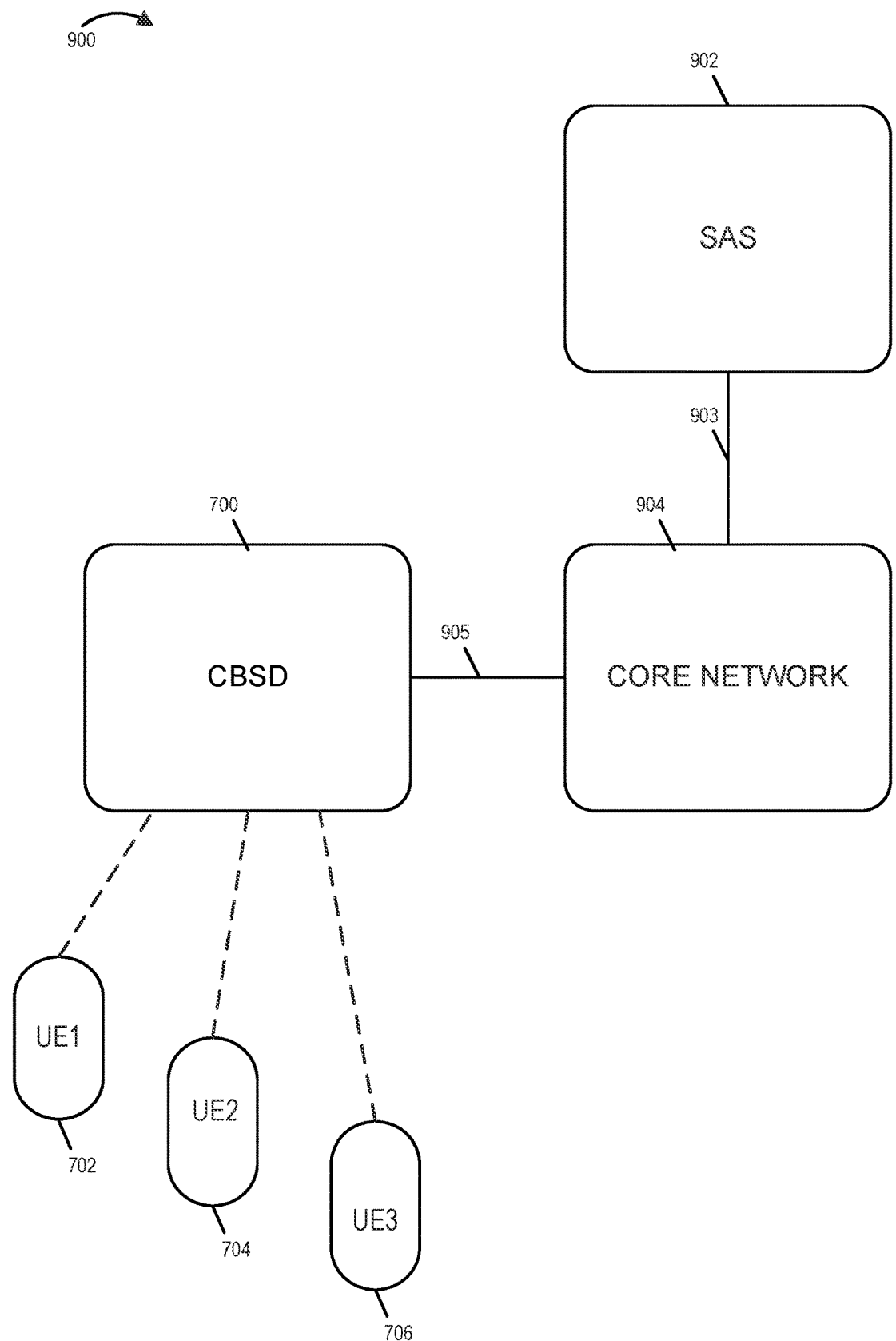
FIG. 9 is a drawing illustrating an exemplary communications system including a spectrum access system (SAS), a core network, a CBSD implemented in accordance with an exemplary embodiment, and a plurality of UEs.

FIG. 9 is a drawing 900 illustrating an exemplary SAS 902, exemplary core network 904, exemplary CBSD 700 and exemplary UEs (UE 1 702, UE 2 704, UE 3 706). SAS 902 is, e.g., SAS 106 of system 100 of FIG. 1. CBSD 700 is coupled to SAS 900, via core network 904 and communications links 905, 903. The CBSD 700 powers on and sends a spectrum request to SAS 902. SAS 902 grants the request and sends a spectrum allocation to CBSD 700. CBSD 700 establishes a network, e.g., including a BSS, and starts transmitting broadcast signals. UEs (702, 704, 706), which are within range of CBSD 700 establish connections with CBSD 700 and start communicating with the CBSD, e.g. receiving paging signals, downlink control signals and downlink traffic signals. The UEs (702, 704, 706) send uplink signals to the CBSD 700, said uplink signals including: location information, channel status information, and sounding reference signal (SRS).

Figure 10:
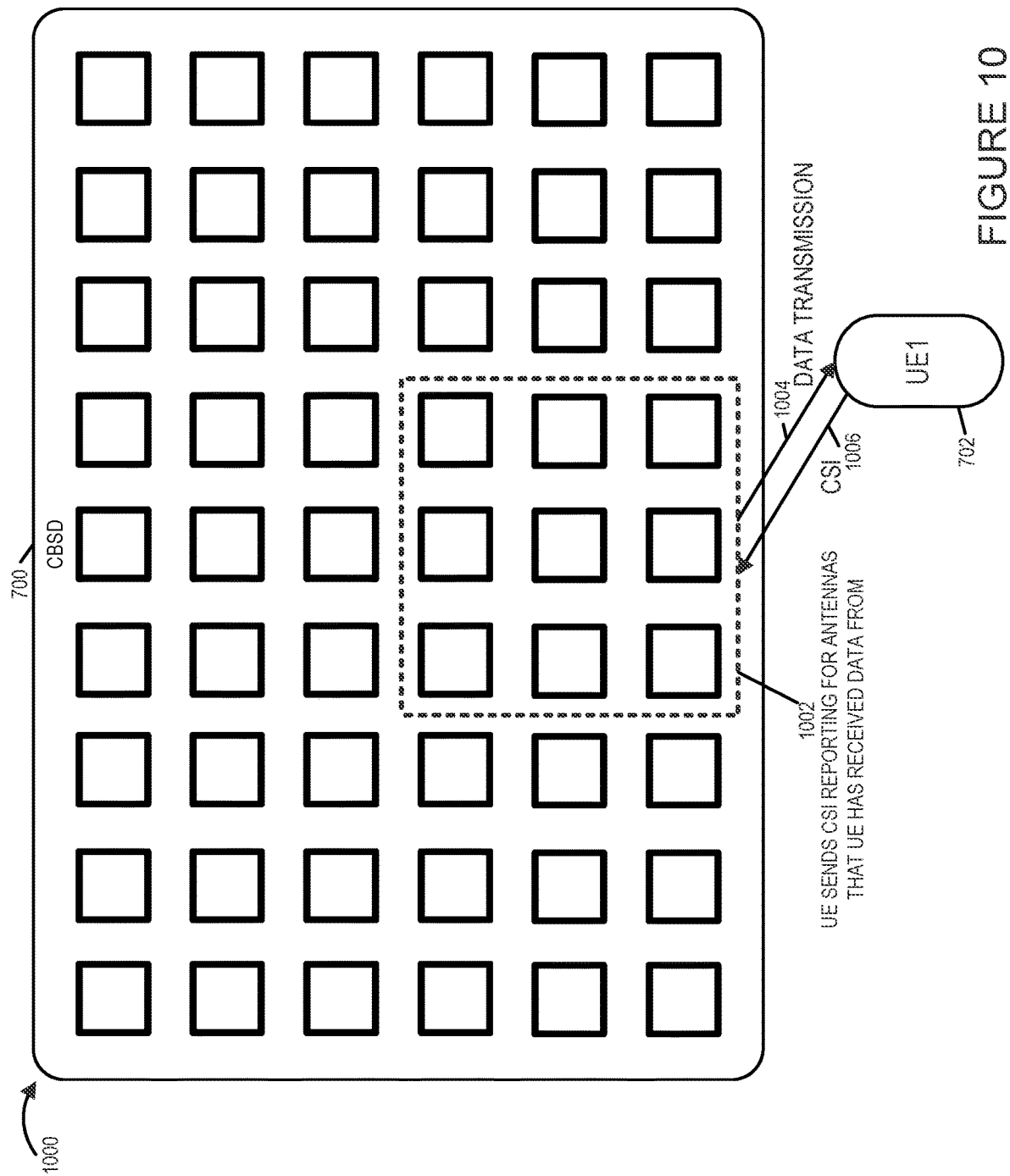
FIG. 10 is a drawing illustrating an exemplary UE device reporting CSI information to a CBSD for antennas that the UE has received data from, wherein the antennas which the UE has received data from are a subset of the antennas in the CBSD's antenna array.

FIG. 10 is a drawing 1000 which illustrates UE 1 702 receiving data transmission signals 1004 from subset of CBSD antennas 1002, e.g., a block of 9 antenna out of 54 antennas. Drawing 1000 further illustrates UE 1 702 sending CSI reports 1006 for antennas (antennas of block 1002) the UE 1 702 has received data from.

Figure 11:
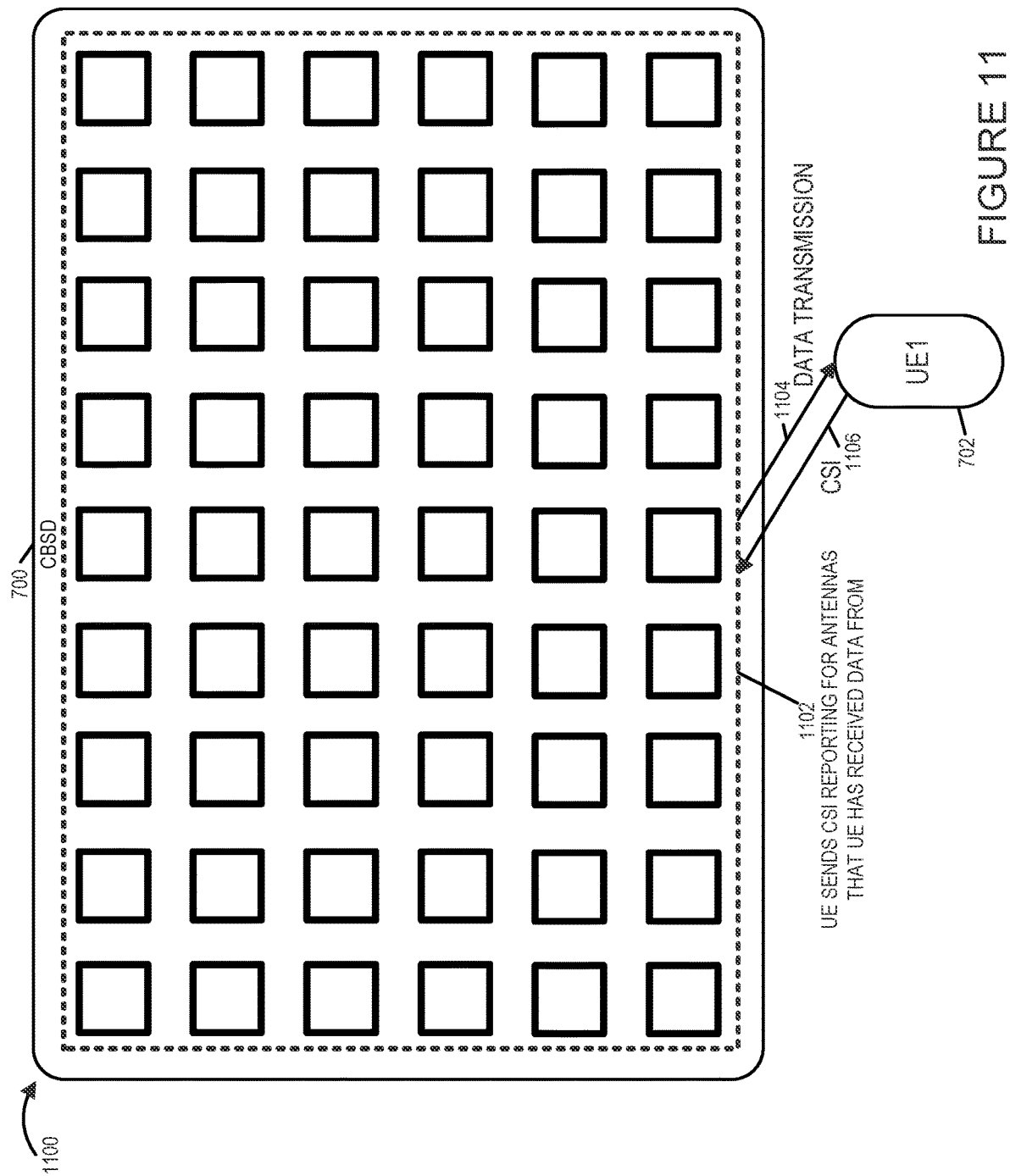
FIG. 11 is a drawing illustrating an exemplary UE device reporting CSI information to a CBSD for antennas that the UE has received data from, wherein the antennas which the UE has received data from are the full set of antennas in the CBSD's antenna array.

FIG. 11 is a drawing 1100 which illustrates UE 1 702 receiving data transmission signals 1104 from the full set of CBSD antennas 1102, e.g., an array of 54 antennas. Drawing 1100 further illustrates UE 1 702 sending CSI reports 1206 for antennas (antennas of array 1102) the UE 1 702 has received data from.

Figure 12:
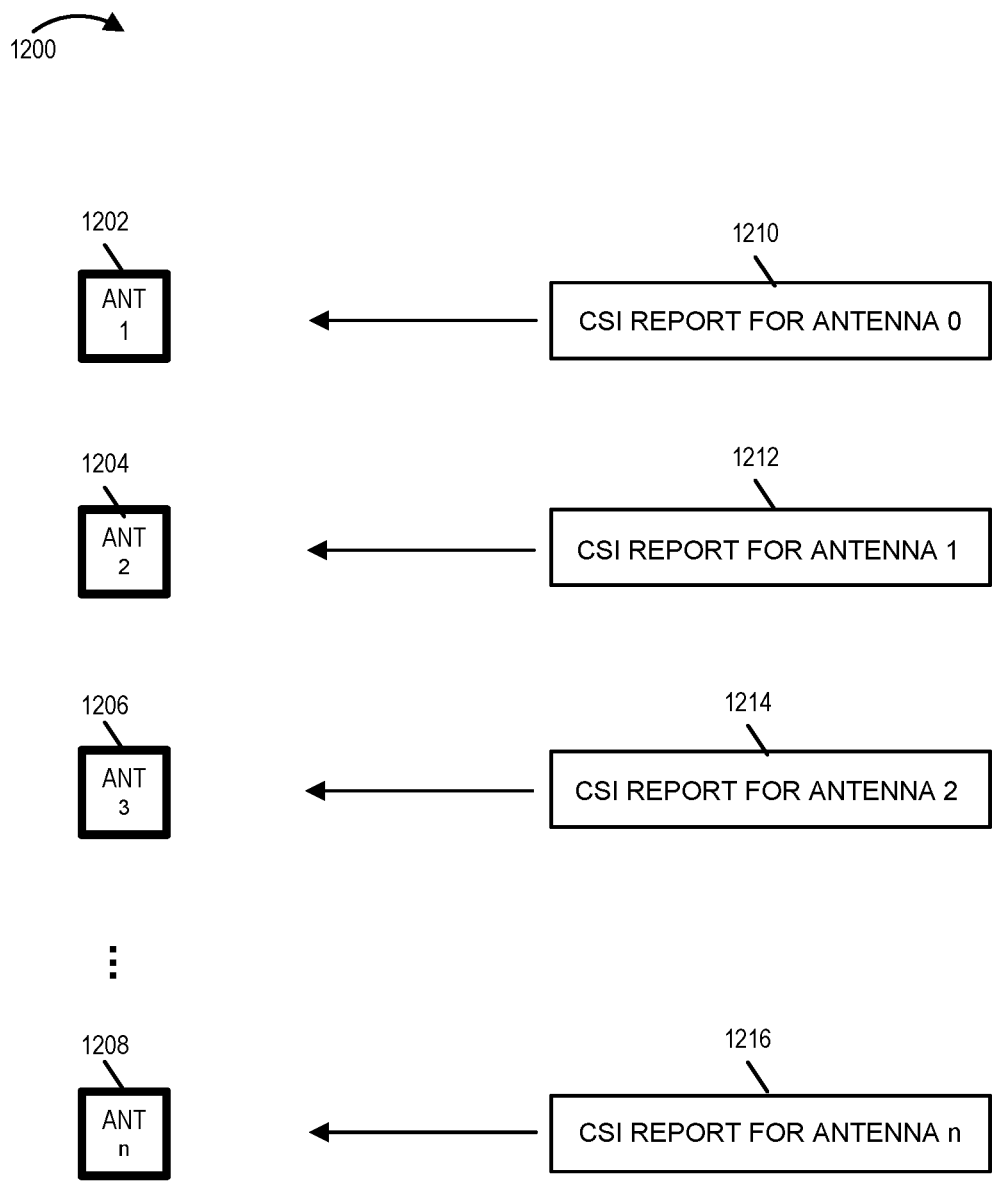
FIG. 12 illustrates a UE generating and sending a CSI report for each of a plurality of antennas in a CBSD's antennas array.

FIG. 12 is a drawing 1200 which illustrates the UE 1 702 generates and sends a CSI report (CSI report 1210, CSO report 1212, CSI report 1214, . . . , CSI report 1216) for each CBSD antenna (antenna 1 1202, antenna 2 1204, antenna 3 1206, . . . , antenna n 1206) from which the UE 702 has received data. In the example of FIG. 10, n=9. In the example of FIG. 11, n=54.

Figure 13:
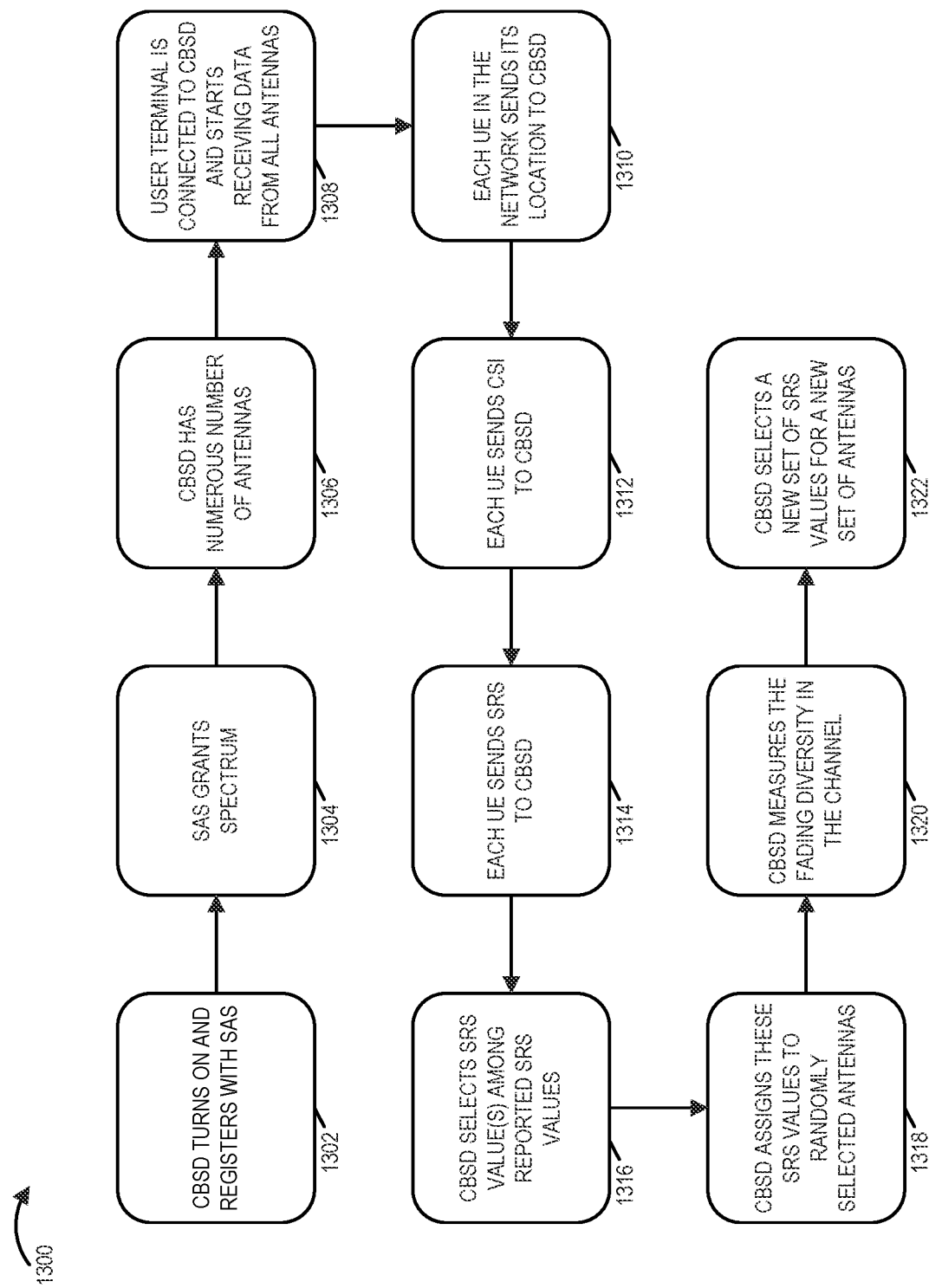
FIG. 13 is a block diagram illustrating an exemplary flow and exemplary characteristics, features and/or aspects in accordance with some embodiments.

FIG. 13 is a block diagram 1300 illustrating exemplary flow and exemplary characteristics in accordance with some embodiments. In step 1302 a CSBD turns on and registers with a SAS. In step 1304, the SAS grants spectrum to the CBSD. Block 1306 indicates that the CBSD has a numerous number of antennas, e.g., the CBSD supports massive MIMO. In step 1308 one or more user terminals (e.g., UEs) are connected to the CBSD. A UE which is connected to the CBSD starts receiving data from each of the antennas of the CBSD. In step 1310 each UE in the network (UEs connected to the CBSD), sends its location to the CBSD, e.g., in response to a paging message. In step 1312 each UE sends channel state information (CSI) to the CBSD, e.g., each UE sends a CSI report corresponding to each of the CBSD antennas. In step 1314 the UE generates and sends a sounding reference signal (SRS) to the CBSD. The SRS signal is received via each of the CBSDs antennas, and a SRS value is determined corresponding to each antenna, based on the received and measured SRS signal at that antenna. The CBSD thus determines, for a UE a set of SRS values (sometimes referred to as reported SRS values), e.g., one for each antenna. The same SRS value may be, and sometimes is determined corresponding to multiple CBSD antennas. In step 1316 the CBSD selects, e.g., for each UE, SRS value(s) from among the reported values, e.g., corresponding to that UE. In step 1318 the CBSD assigns these selected SRS values to randomly or semi-randomly selected antennas. A determined SRS value or a selected SRS value (which replaced a determined SRS) value is used to control, e.g., adjust or set, the transmitter chain corresponding to the CBSD antenna (e.g., control gain and/or phase associated with an amplifier or other component in the transmitter chain). The CBSD transmits to the UE via each of the transmitter chains and corresponding antennas in accordance with the control adjustments based on determined and assigned SRS. In step 1320 the CBSD measures fading diversity in the channel. In step 1322 the CBSD selects, for a UE, a new set of SRS values for a new set of antennas, after sending another SRS to the CBSD.

Figure 14:
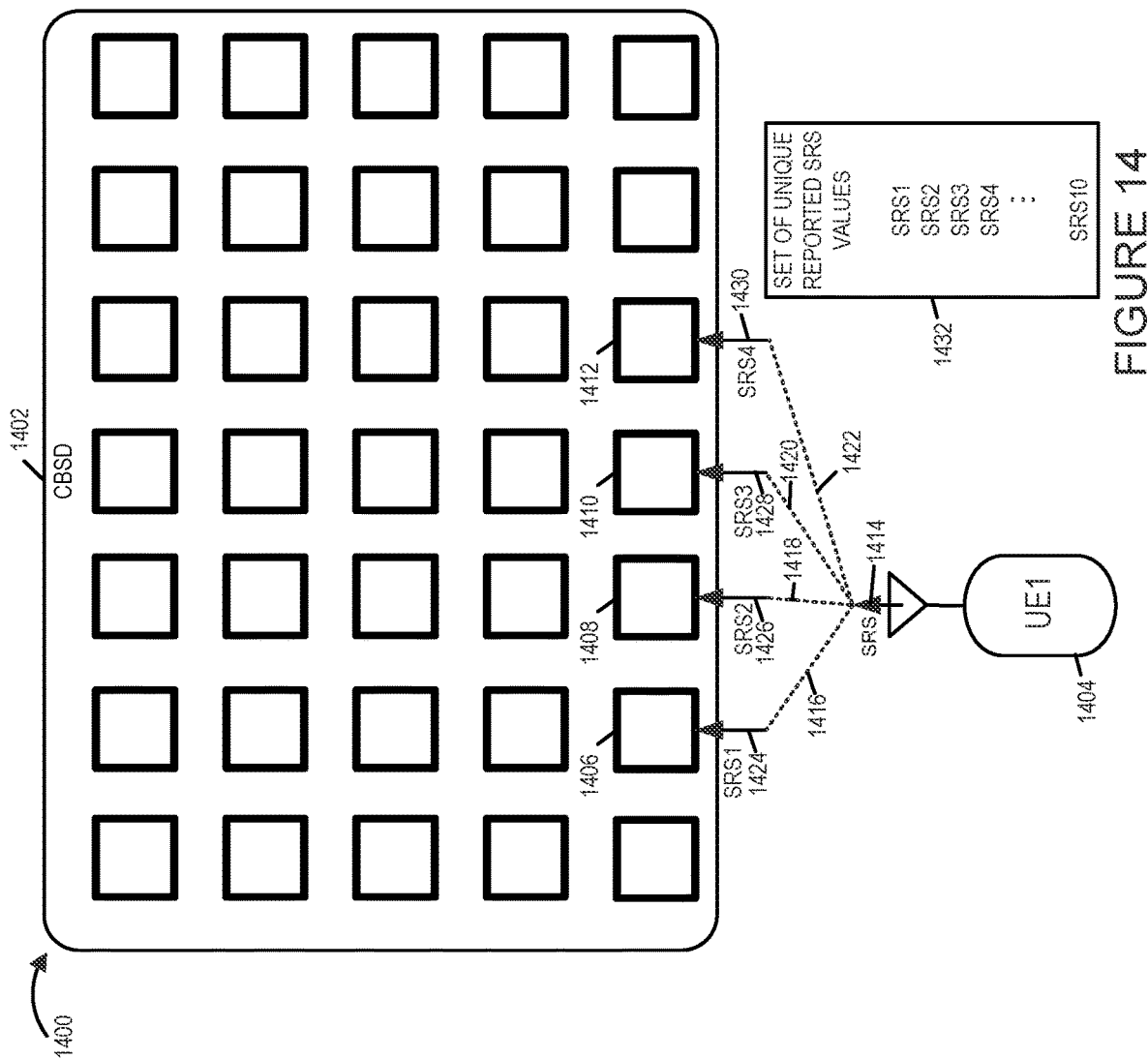
FIG. 14 is a drawing illustrating an exemplary UE sending SRS to a CBSD, which includes and antenna array, and the SRS is received by each of the CBSDs antennas and measured, and a set of unique reported SRS values is generated.
Figure 15:
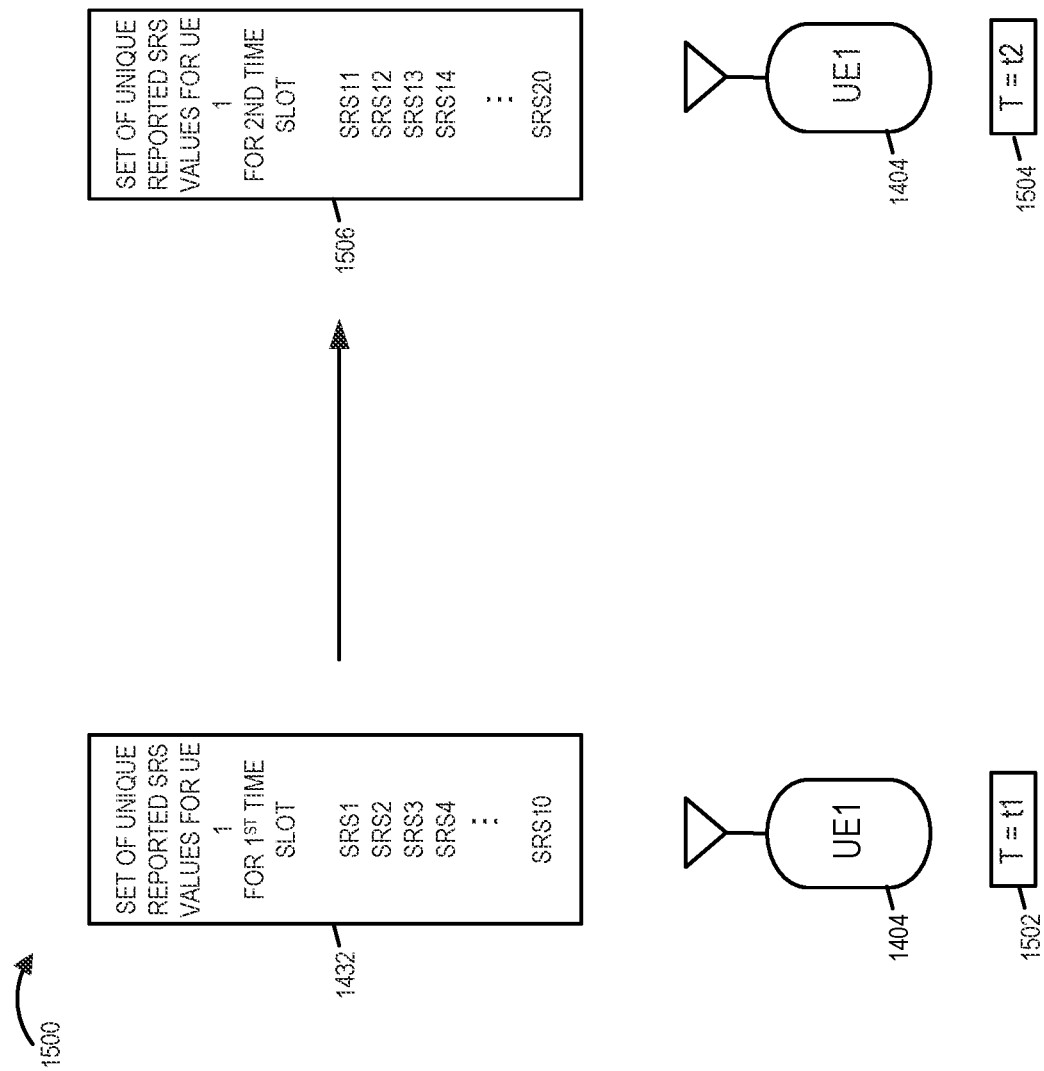
FIG. 15 illustrates that different sets of reported SRS values are determined for different time slots, each set based on a received SRS.

FIG. 14 is a drawing 1400 illustrating exemplary UE 1 1404 sending SRS 1414 to CBSD 1402, which includes and antenna array including 35 antennas. The SRS signal is received by each of the CBSDs antennas and measured. Reception by four of the antennas is shown in FIG. 15 (for simplicity), but it should be understood that each of the 35 antennas receives the transmitted SRS. Transmitted SRS signal 1414 is communicated via channel 1416 and received via antenna 1406; the received signal is processed, e.g., measured, and value SRS1 is determined. Transmitted SRS signal 1414 is communicated via channel 1418 and received via antenna 1408; the received signal is processed, e.g., measured, and value SRS2 is determined. Transmitted SRS signal 1414 is communicated via channel 1420 and received via antenna 1410; the received signal is processed, e.g., measured, and value SRS3 is determined. Transmitted SRS signal 1414 is communicated via channel 1422 and received via antenna 1412; the received signal is processed, e.g., measured, and value SRS4 is determined. A SRS value is determined corresponding to the each of the 35 antennas of CBSD 1402. The determined SRS values (sometimes referred to as reported SRS values) corresponding to some antennas may be, and sometimes are the same. Block 1432 represents an exemplary set of unique (determined) reported SRS values: SRS1, SRS2, SRS3, SRS4, SRS5, SRS6, SRS7, SRS8, SRS9, SRS10 corresponding to UE 1 for a first time.

FIG. 15 is a drawing 1500 which illustrates that at each time slot a new set of SRS values is determined (reported) for UE 1 1004. For time T=t1, as indicated by block 1502, the set of unique reported SRS values is set 1432 (of FIG. 14). For subsequent time T=t2, as indicated by block 1504, the set of unique (determined) reported SRS values is set 1506: SRS11, SRS12, SRS13, SRS 14, SRS15, SRS16, SRS16, SRS17, SRS18, SRS19, SRS20, which is determined based on reception and measurement of another SRS which was subsequently transmitted from UE1. The number of values in a set of unique SRS values may be, and sometimes does, change from time slot to time slot for the UE.

Although FIG. 15 shows operations for a single UE; however, it should be appreciated that the same type of operations are being performed for other UEs, e.g., UE 2 and UE 3, which are also connected and being serviced by the CBSD.

Figure 16:
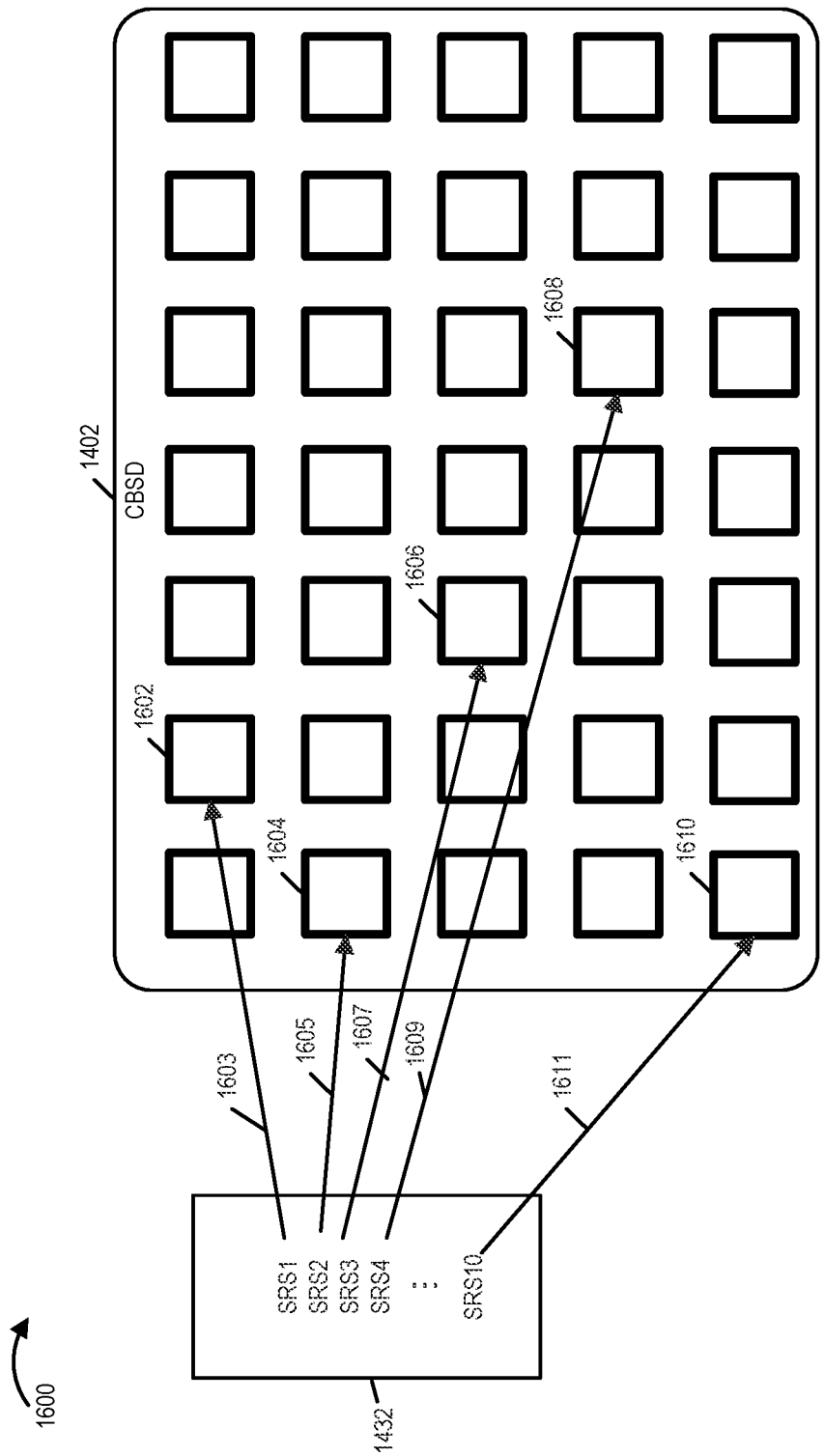
FIG. 16 illustrates an example in which a CBSD assigns SRS values to randomly selected or semi-randomly selected antennas in accordance with an exemplary embodiment.

FIG. 16 is a drawing 1600 which illustrates an example in which CBSD 1402 assigns a different SRS value to each (randomly or semi-randomly selected) antenna from the group 1432 of determined SRS values (for UE 1). In this example, CBSD 1402 assigns the value SRS1 to antenna 1602, as indicated by arrow 1603. CBSD 1402 assigns the value SRS2 to antenna 1604, as indicated by arrow 1605. CBSD 1402 assigns the value SRS3 to antenna 1606, as indicated by arrow 1607. CBSD 1402 assigns the value SRS4 to antenna 1608, as indicated by arrow 1609. CBSD 1402 assigns the value SRS10 to antenna 1610, as indicated by arrow 1611.

The group of SRS values that can be used by the CBSD is updated by the new group of determined (reported) SRS values for the UE. Each time UEs sends a new SRS, a new set of determined (reported) SRS values are created and CBSD selects SRS values from among that set to randomly or semi-randomly assign to antennas.

Figure 17:
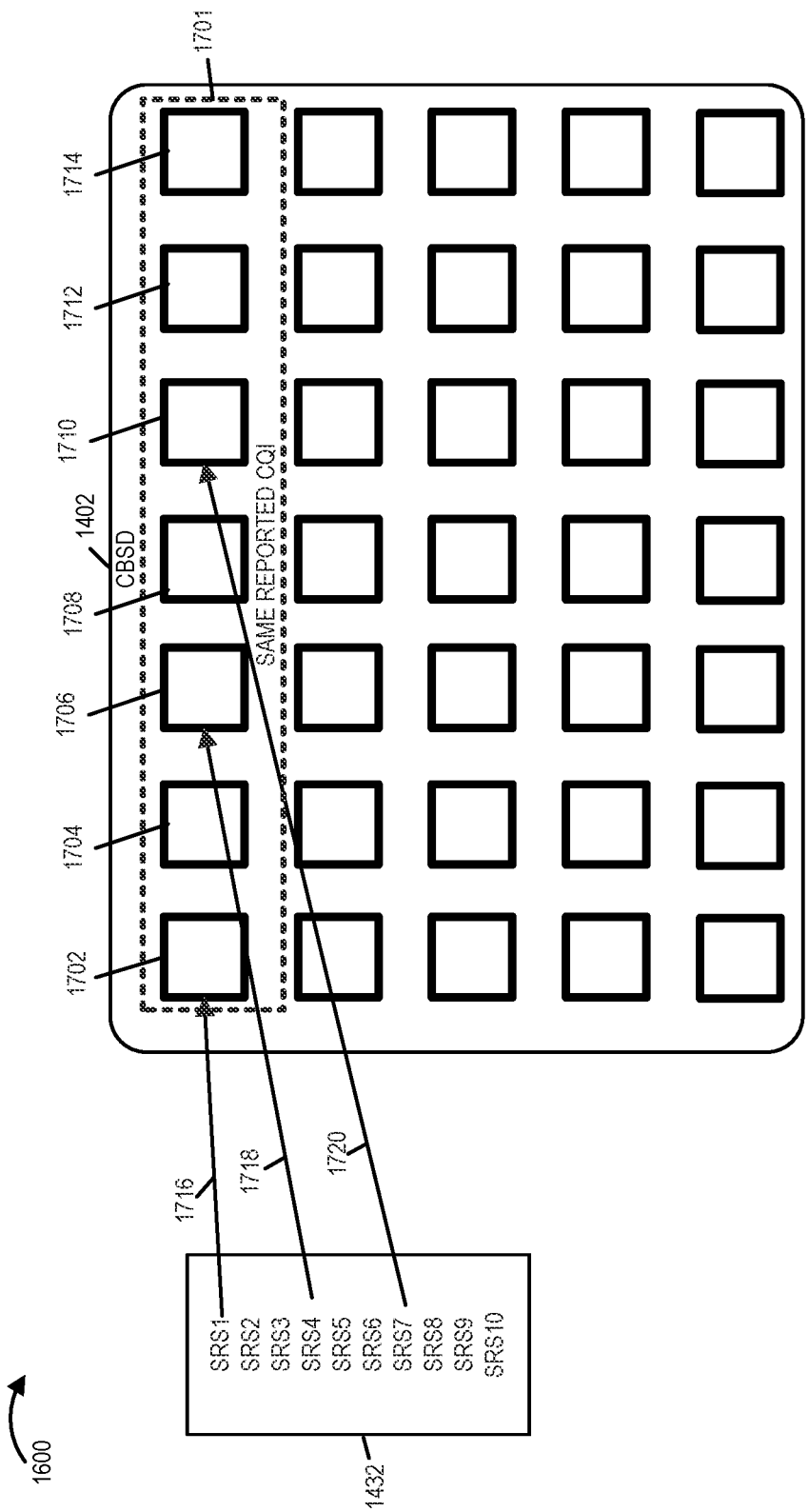
FIG. 17 illustrates an example in which a CBSD assigns different SRS values to antennas in set of antennas having the same reported CQI in accordance with an exemplary embodiment.

FIG. 17 is a drawing 1700 illustrating an example in which different SRS values are intentionally assigned by CBSD 1402 to antennas having the same reported channel indicator (CQI) value in accordance with an exemplary embodiment. In the example of FIG. 17, UE 1 1404 has reported the same CQI for the block 1701 of seven antennas (antenna 1 1702, antennas 2 1704, antenna 3 1706, antenna 4 1708, antenna 5 1710, antenna 5 1712, antenna 7 1714). The CQI value reported for each antenna (1702, 1704, 11706, 1708, 1710, 1712, 1714) is equal to each other. For example, the CBSD 1402 assigns a different SRS value to a subset of these antennas. The value SRS1 is assigned to antenna 1 1702, as indicated by arrow 1716. The value SRS4 is assigned to antenna 3 1706, as indicated by arrow 1718. The value SRS7 is assigned to antenna 5 1710, as indicated by arrow 1718. CBSD 1402 can assign SRS values for the SRS set 1432 in any order.

Figure 18:
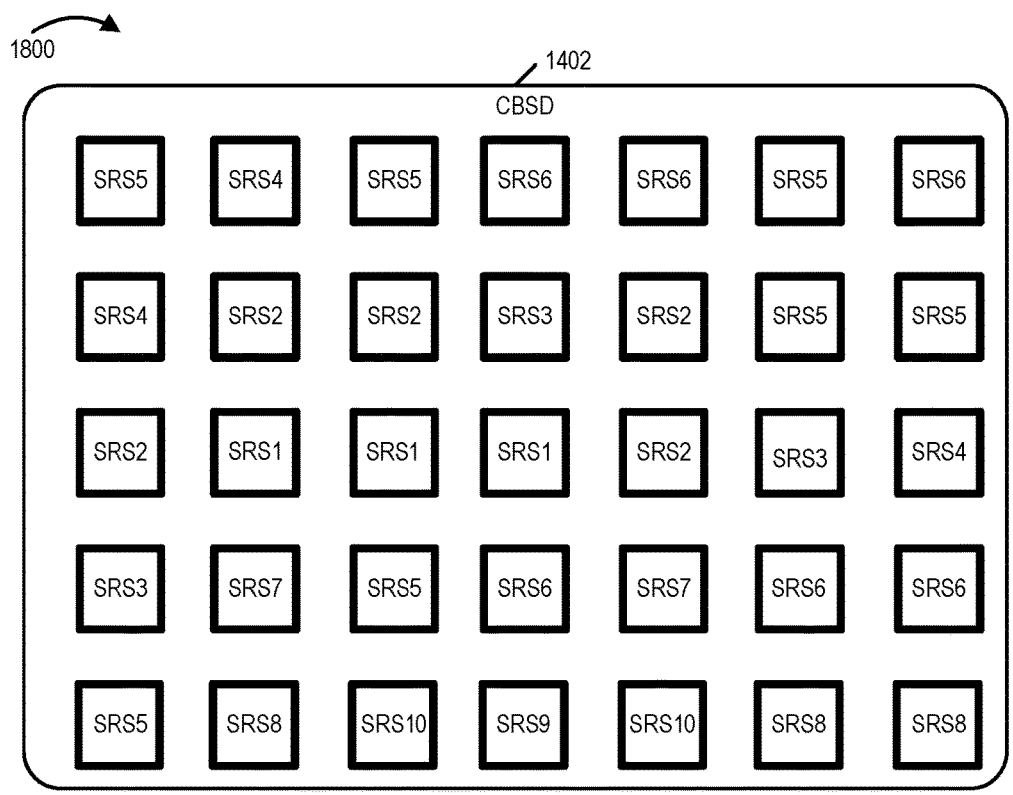
FIG. 18 is a drawing illustrating an example in which exemplary CBSD supporting massive MIMO has received an SRS signal from a UE via each of its antennas, determined SRS values corresponding to each of the antennas, determined a set of unique SRS values, and assigned selected SRS values from the set of unique SRS values to randomly selected or semi-randomly selected antennas in accordance with an exemplary embodiment.
Figure 18:
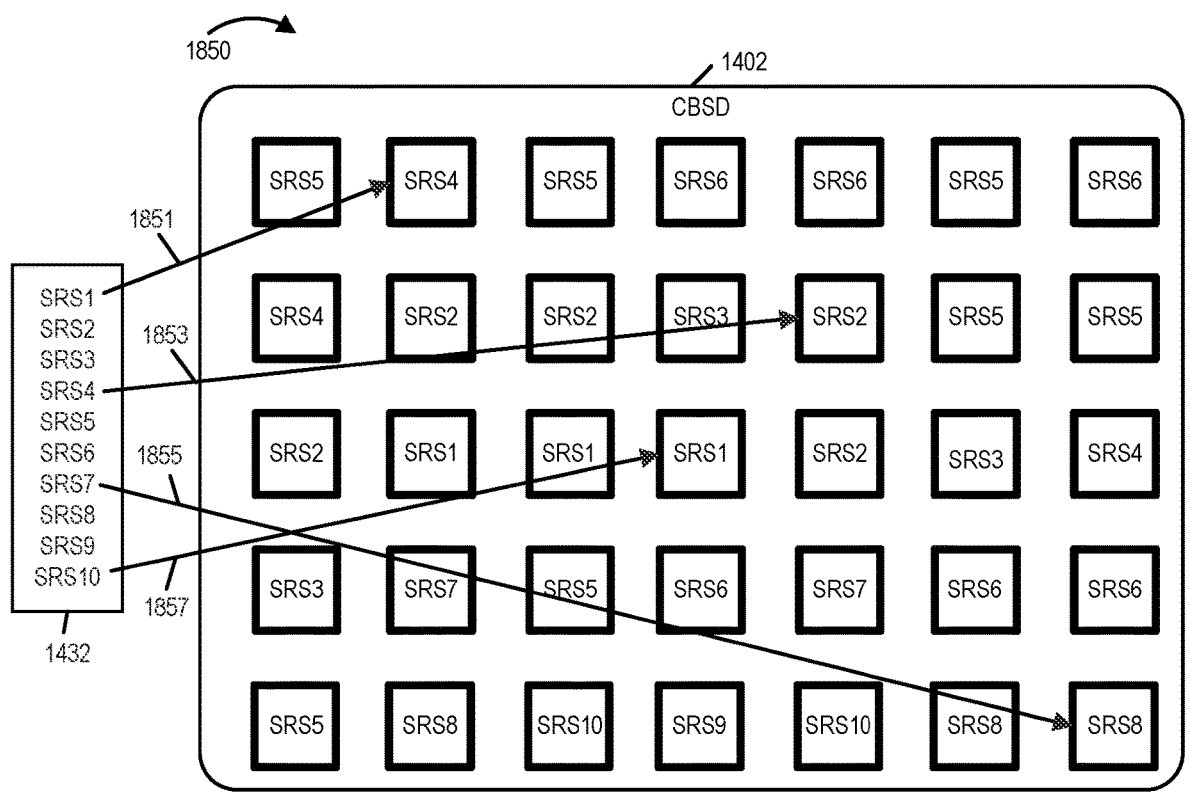

FIG. 18 is a drawing 1800 illustrating an example in which exemplary CBSD 1402 has received an SRS signal from a UE via each of its antennas and determined SRS values corresponding to each of the antennas. The determined SRS values are indicated within each square representing an antenna in the antenna array. In this example, there is a set of 10 unique SRS values 1432 including the SRS values: SRS1, SRS2, SRS3, SRS4, SRS5, SRS6, SRS7, SRS8, SRS9, and SRS10. The CBSD 1402 selects to assign SRS1, SRS4, SRS7 and SRS10 to antennas within the array, e.g., to replace the determined SRS value that currently corresponds to that antenna. In this example, CBSD 1402 randomly or semi-randomly selects to assign SRS1 to the antenna in row 1 column 2, as indicated by arrow 1851. In this example, CBSD 1402 randomly or semi-randomly selects to assign SRS4 to the antenna in row 2 column 5, as indicated by arrow 1853. In this example, CBSD 1402 randomly or semi-randomly selects to assign SRS7 to the antenna in row 5 column 7, as indicated by arrow 1855. In this example, CBSD 1402 randomly or semi-randomly selects to assign SRS10 to the antenna in row 3 column 4, as indicated by arrow 1857.

Figure 19:
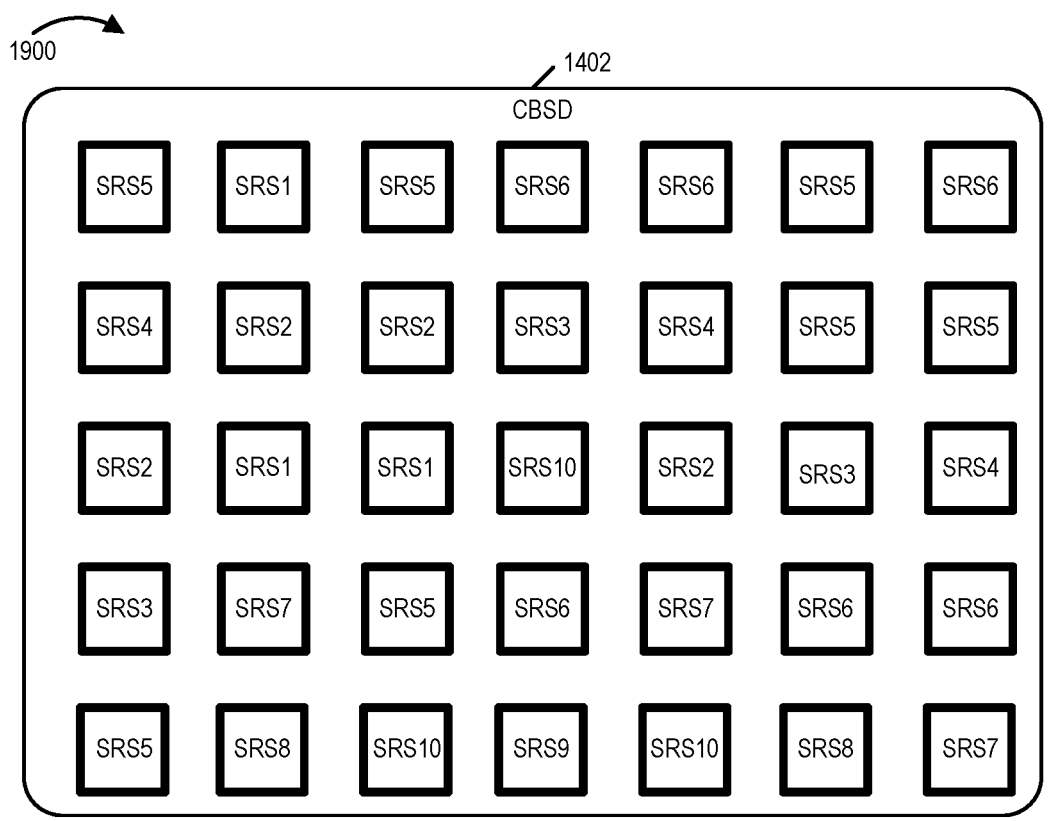
FIG. 19 is a drawing illustrating SRS values corresponding to each antenna which are to be used to control transmission, some of the SRS values are selected SRS values which have replaced determined SRS values, in accordance with a feature of an exemplary embodiment.

FIG. 19 is a drawing 1900 illustrating the results of the operations of FIG. 1850 (assignment of selected SRS values from the set of SRS values to randomly or semi-randomly selected antennas resulting in the replacement of some of the determined SRS values by selected SRS values). The SRS values in FIG. 19 in each of the boxes corresponding to an antennal indicate the SRS values that will be used to control transmission (e.g., adjust gain and/or phase with regard to transmission) to the UE.

Figure 20:
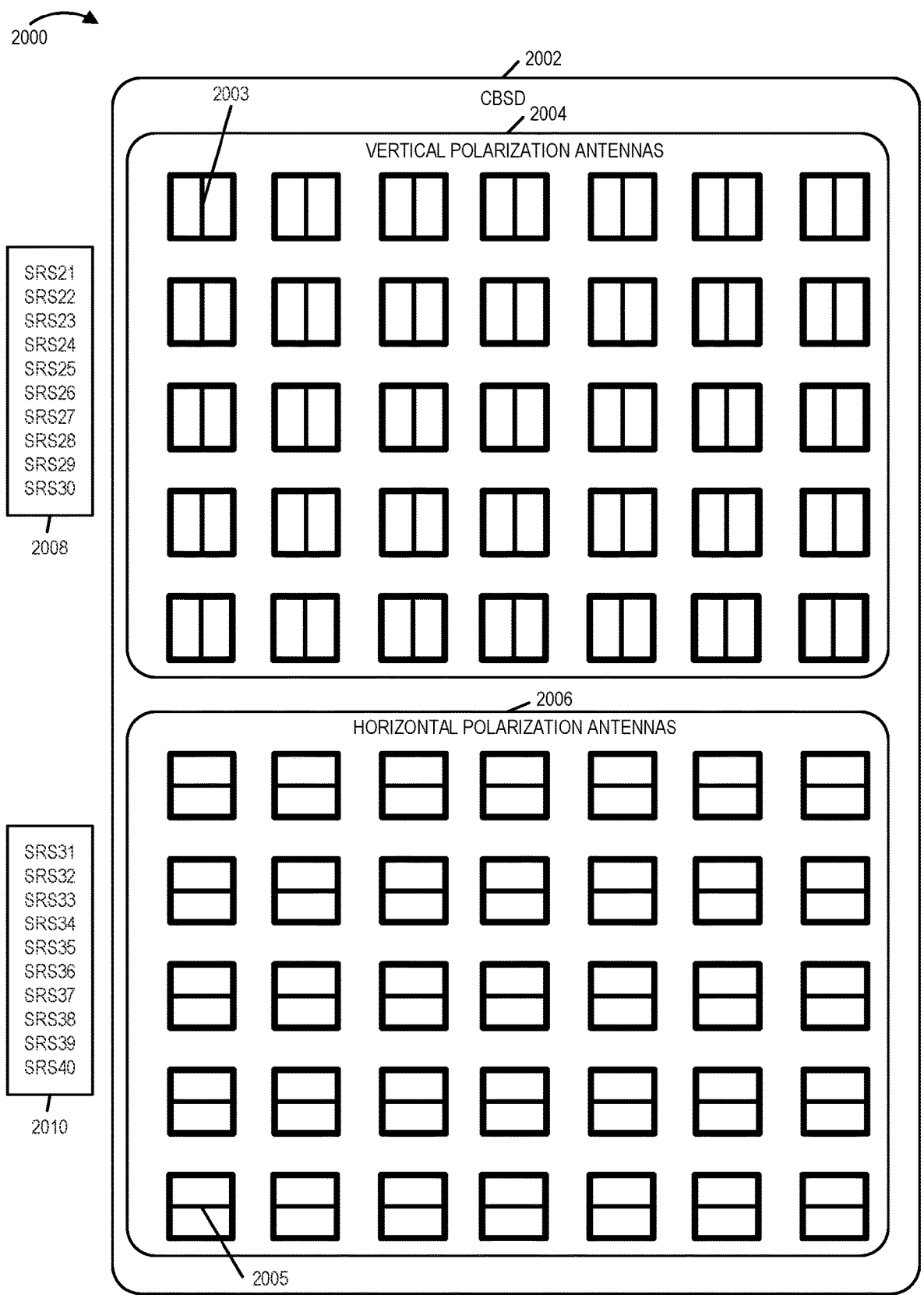
FIG. 20 is a drawing illustrating an exemplary CBSD including vertical and horizontal polarization antennas in accordance with an exemplary embodiment.

FIG. 20 is a drawing 2000 of an exemplary CBSD 2002 in accordance with an exemplary embodiment. CBSD 2002 is, e.g., CBSD 500 of FIG. 4, which is implementing an exemplary method in accordance with flowchart 200 of FIG. 2 and/or flowchart 400 of FIG. 3. CBSD 2002 supports massive MIMO and includes an vertical polarization antenna array 2004 including 35 vertical polarization antennas 2003 and a horizontal polarization antenna array 2006 including 35 horizontal polarization antennas 2005. In some embodiments, with regard to the physical layout within the CBSD 2002, one array overlay the other, e.g., the vertical polarization array 2004 overlays the horizontal polarization array 2006.

With regard to a received SRS signal from a UE, in some embodiments, the determined SRS values are grouped based on the polarization. In one example, set of SRS values 2008 corresponds to a set of unique SRS values determined based on measurements of received SRS signals via the vertical polarization antennas and set of SRS values 2010 corresponds to a set of unique SRS values determined based on measurements of received SRS signals via the horizontal polarization antennas. In some such embodiments, the assignment of selected SRS values (replacing determined SRS values) for some antennas is performed separately for vertical polarization and horizontal polarization.

Numbered List of Exemplary Method Embodiments

Method Embodiment 1. A method of operating a base station (e.g., a Citizens Broadband Radio Services Device (CBSD) base station), the method comprising: receiving (410) a first Sounding Reference Signal (SRS) from a first wireless terminal (e.g. UE device being served by the base station) on each of a plurality of antennas; determining (412), at the base station, from the received first SRS, at least a first set of SRS values, each SRS value in the first set of SRS values corresponding to a different antenna, said SRS values including a first SRS value corresponding to a first antenna; assigning (418) (e.g., by a random or semi-random assignment process) at least some determined SRS values to antennas to which the assigned SRS values do not correspond; adjusting (424) transmitter control values corresponding to different antennas based on the assigned SRS values; and transmitting (432) a signal from said plurality of antennas to the first wireless terminal using the adjusted transmitter control values to control transmission from at least some of said plurality of antennas.

Method Embodiment 2. The method of Method Embodiment 1, wherein assigning (418) (e.g., by a random or semi-random assignment process) at least some determined SRS values to antennas to which the assigned SRS values do not correspond includes: assigning (420) the first SRS value corresponding to the first antenna to a first different antenna, said first different antenna being an antenna in said plurality of antennas which is not the first antenna; wherein adjusting (424) transmitter control values corresponding to different antennas based on the assigned SRS values includes: adjusting (426) a first transmitter control value (e.g., gain and/or phase control value associated with an amplifier used to amplify a signal transmitted by the first different antenna) corresponding to the first different antenna based on the assigned first SRS value; and wherein transmitting (432) a signal from said plurality of antennas to the first wireless terminal includes: transmitting (434) a signal to the first wireless terminal from the first different antenna in accordance with the first transmitter control value.

Method Embodiment 2A. The method of Method Embodiment 2, further comprising: selecting (416) from the first set of SRS values a subset of unique SRS values to be used for assignment to antennas.

Method Embodiment 2B. The method of Method Embodiment 2, wherein some of the antennas to which different SRS values are assigned have the same channel quality.

Method Embodiment 2C. The method of Method Embodiment 1, wherein said assigning (418) (e.g., by a random or semi-random assignment process) at least some determined SRS values to antennas to which the assigned SRS values do not correspond results in replacement of a fraction of the SRS values corresponding to antennas in said first set of SRS values.

Method Embodiment 2D. The method of Method Embodiment 2, wherein said fraction is less than half of the antennas in said plurality of antennas.

Method Embodiment 3. The method of Method Embodiment 1, wherein assigning (418) (e.g., by a random or semi-random assignment process) at least some of the determined SRS values to antennas to which the assigned SRS values do not correspond includes: assigning (422) a second SRS value corresponding to a second antenna to another antenna, said second SRS value being different from said first SRS value, said another antenna being an antenna in said plurality of antennas which is not the second antenna and which is not the first different antenna to which the first SRS value is assigned; wherein adjusting (424) transmitter control values corresponding to different antennas based on the assigned SRS values includes: adjusting (428) a second transmitter control value (e.g., gain and/or phase control value associated with an amplifier used to amplify a signal transmitted by the another antenna) corresponding to the another antenna based on the assigned second SRS value; and wherein transmitting (432) a signal from said plurality of antennas to the first wireless terminal includes: transmitting (436) a signal to the first wireless terminal from the another antenna in accordance with the second transmitter control value.

Method Embodiment 4. The method of Method Embodiment 3, further comprising: receiving (404) channel state information (CSI) corresponding to each of said plurality of antennas prior to assigning (418) (e.g., by a random or semi-random assignment process) at least some determined SRS values to antennas to which the assigned SRS values do not correspond.

Method Embodiment 4A. The method of Method Embodiment 4, wherein the received CSI includes include a channel quality indicator (CQI) value corresponding to each of said plurality of antennas.

Method Embodiment 5. The method of Method Embodiment 4, wherein assigning (418) (e.g., by a random or semi-random assignment process) at least some determined SRS values to antennas to which the assigned SRS values do not correspond includes assigning (423) SRS values to multiple antennas having a same channel quality (e.g., as indicated by reported channel quality indicators (CQIs)).

Method Embodiment 5A. The method of Method Embodiment 5, wherein said first different antenna and said another antenna had the same channel quality (e.g. as indicated by the reported CQIs) prior to said step of assigning (418) (e.g., by a random or semi-random assignment process) at least some determined SRS values to antennas to which the assigned SRS values do not correspond.

Method Embodiment 5B. The method of Method Embodiment 5A, wherein the first different antenna and said another antenna are adjacent antennas.

Method Embodiment 5C. The method of Method Embodiment 5A, wherein the first different antenna and said another antenna are in the same row or the same column of an antenna array.

Method Embodiment 6. The method of Method Embodiment 3, wherein the first SRS value is an SRS value which occurs multiple times in said first set of SRS values; and wherein the second SRS value is an SRS value which also occurs multiple times in said first set of SRS values.

Method Embodiment 7. The method of Method Embodiment 3, wherein the first SRS value corresponds to a first type of antenna (e.g., a vertically polarized or horizontally polarized antenna); and wherein the first different antenna (e.g., is vertically polarized) is of the same antenna type as the first antenna.

Method Embodiment 7A. The method of Method Embodiment 7, wherein the first type antenna is a vertically polarized antenna.

Method Embodiment 8. The method of Method Embodiment 6, wherein the second SRS value corresponds to a second type of antenna (e.g., a vertically polarized or horizontally polarized antenna); and wherein the another antenna is of the same antenna type (e.g., horizontally polarized) as the second antenna.

Method Embodiment 9. The method of Method Embodiment 8, wherein the second type of antenna is a horizontally polarized antenna.

Method Embodiment 10. The method of Method Embodiment 2, further comprising: receiving (446) a second Sounding Reference Signal (SRS) from the first wireless terminal (e.g. UE device being served by the base station) on each of the plurality of antennas; determining (448), at the base station, from the received second SRS, at least a second set of SRS values, each SRS value in the second set of SRS values corresponding to a different antenna, said SRS values in the second set of SRS values including a third SRS value corresponding to the first antenna; assigning (454) (e.g., by a random or semi-random assignment process) at least some determined SRS values in the second set of SRS values to antennas to which the assigned SRS values from the second set of SRS values do not correspond; adjusting (456) transmitter control values corresponding to different antennas based on the assigned at least some SRS values from the second set of SRS values; and transmitting (458) a signal from said plurality of antennas to the first wireless terminal using the adjusted transmitter control values which were adjusted based on the assigned SRS values from the second set of SRS values (e.g., with the assigned values controlling transmission from at least some of said plurality of antennas).

Method Embodiment 11. The method of Method Embodiment 10, further comprising: receiving (404) first channel state information from the first wireless terminal prior to receiving (410) the first SRS signal; and receiving (438) second channel state information from the first wireless terminal after adjusting (426) the first transmitter control value corresponding to the first different antenna based on the assigned first SRS value, said second channel state information including at least some change from the first channel state information due to the adjusting of the first transmitter control value.

Method Embodiment 12. The method of Method Embodiment 8, further comprising: providing (442) said second channel state information to a scheduler; and operating (450) the scheduler to schedule transmissions to wireless terminals including said first wireless terminal based on at least some of said second channel state information.

Numbered List of Exemplary Apparatus Embodiments

Apparatus Embodiment 1. A base station (e.g., a Citizens Broadband Radio Services Device (CBSD) base station) (500) comprising: a plurality of antennas (515, 517, . . . , 519); and a processor (502) configured to: operate the base station to receive (410) a first Sounding Reference Signal (SRS) from a first wireless terminal (e.g. UE device being served by the base station) on each of a plurality of antennas; determine (412), at the base station, from the received first SRS, at least a first set of SRS values, each SRS value in the first set of SRS values corresponding to a different antenna, said SRS values including a first SRS value corresponding to a first antenna; assign (418) (e.g., by a random or semi-random assignment process) at least some determined SRS values to antennas to which the assigned SRS values do not correspond; adjust (424) transmitter control values corresponding to different antennas based on the assigned SRS values; and operate the base station to transmit (432) a signal from said plurality of antennas to the first wireless terminal using the adjusted transmitter control values to control transmission from at least some of said plurality of antennas.

Apparatus Embodiment 2. The base station of Apparatus Embodiment 1, wherein said processor is further configured to: assign(420) the first SRS value corresponding to the first antenna to a first different antenna, said first different antenna being an antenna in said plurality of antennas which is not the first antenna, as part of being configured to assign (418) (e.g., by a random or semi-random assignment process) at least some determined SRS values to antennas to which the assigned SRS values do not correspond; adjust (426) a first transmitter control value (e.g., gain and/or phase control value associated with an amplifier used to amplify a signal transmitted by the first different antenna) corresponding to the first different antenna based on the assigned first SRS value, as part of being configured to adjust (424) transmitter control values corresponding to different antennas based on the assigned SRS values; and operate the base station to transmit (434) a signal to the first wireless terminal from the first different antenna in accordance with the first transmitter control value, as part of being configured to operate the base station to transmit (432) a signal from said plurality of antennas to the first wireless terminal.

Apparatus Embodiment 2A. The base station of Apparatus Embodiment 2, wherein said processor is further configured to: select (416) from the first set of SRS values a subset of unique SRS values to be used for assignment to antennas.

Apparatus Embodiment 2B. The base station of Apparatus Embodiment 2, wherein some of the antennas to which different SRS values are assigned have the same channel quality.

Apparatus Embodiment 2C. The base station of Apparatus Embodiment 1, wherein said assigning (418) (e.g., by a random or semi-random assignment process) at least some determined SRS values to antennas to which the assigned SRS values do not correspond results in replacement of a fraction of the SRS values corresponding to antennas in said first set of SRS values.

Apparatus Embodiment 2D. The base station of Apparatus Embodiment 2, wherein said fraction is less than half of the antennas in said plurality of antennas.

Apparatus Embodiment 3. The base station of Apparatus Embodiment 1, wherein said processor is further configured to: assign (422) a second SRS value corresponding to a second antenna to another antenna, as part of being configured to assign (418) (e.g., by a random or semi-random assignment process) at least some of the determined SRS values to antennas to which the assigned SRS values do not correspond, said second SRS value being different from said first SRS value, said another antenna being an antenna in said plurality of antennas which is not the second antenna and which is not the first different antenna to which the first SRS value is assigned; adjust (428) a second transmitter control value (e.g., gain and/or phase control value associated with an amplifier used to amplify a signal transmitted by the another antenna) corresponding to the another antenna based on the assigned second SRS value, as part of being configured to adjust (424) transmitter control values corresponding to different antennas based on the assigned SRS values; and operate the base station to transmit (436) a signal to the first wireless terminal from the another antenna in accordance with the second transmitter control value, as part of being configured to operate the base station to transmit (432) a signal from said plurality of antennas to the first wireless terminal.

Apparatus Embodiment 4. The base station of Apparatus Embodiment 3, wherein said processor is further configured to: operate the base station to receive (404) channel state information (CSI) corresponding to each of said plurality of antennas prior to assigning (418) (e.g., by a random or semi-random assignment process) at least some determined SRS values to antennas to which the assigned SRS values do not correspond.

Apparatus Embodiment 4A. The base station of Apparatus Embodiment 4, wherein the received CSI includes include a channel quality indicator (CQI) value corresponding to each of said plurality of antennas.

Apparatus Embodiment 5. The base station of Apparatus Embodiment 4, wherein said processor is further configured to: assign (423) SRS values to multiple antennas having a same channel quality (e.g., as indicated by reported channel quality indicators (CQIs)), as part of being configured to assign (418) (e.g., by a random or semi-random assignment process) at least some determined SRS values to antennas to which the assigned SRS values do not correspond.

Apparatus Embodiment 5A. The base station of Apparatus Embodiment 5, wherein said first different antenna and said another antenna had the same channel quality (e.g. as indicated by the reported CQIs) prior to said step of assigning (418) (e.g., by a random or semi-random assignment process) at least some determined SRS values to antennas to which the assigned SRS values do not correspond.

Apparatus Embodiment 5B. The base station of Apparatus Embodiment 5A, wherein the first different antenna and said another antenna are adjacent antennas.

Apparatus Embodiment 5C. The base station of Apparatus Embodiment 5A, wherein the first different antenna and said another antenna are in the same row or the same column of an antenna array.

Apparatus Embodiment 6. The base station of Apparatus Embodiment 3, wherein the first SRS value is an SRS value which occurs multiple times in said first set of SRS values; and wherein the second SRS value is an SRS value which also occurs multiple times in said first set of SRS values.

Apparatus Embodiment 7. The base station of Apparatus Embodiment 3, wherein the first SRS value corresponds to a first type of antenna (e.g., a vertically polarized or horizontally polarized antenna); and wherein the first different antenna (e.g., is vertically polarized) is of the same antenna type as the first antenna.

Apparatus Embodiment 7A. The base station of Apparatus Embodiment 7, wherein the first type antenna is a vertically polarized antenna.

Apparatus Embodiment 8. The base station of Apparatus Embodiment 6, wherein the second SRS value corresponds to a second type of antenna (e.g., a vertically polarized or horizontally polarized antenna); and wherein the another antenna is of the same antenna type (e.g., horizontally polarized) as the second antenna.

Apparatus Embodiment 9. The base station of Apparatus Embodiment 8, wherein the second type of antenna is a horizontally polarized antenna.

Apparatus Embodiment 10. The base station of Apparatus Embodiment 2, wherein said processor is further configured to: operate the base station to receive (446) a second Sounding Reference Signal (SRS) from the first wireless terminal (e.g. UE device being served by the base station) on each of the plurality of antennas; determine (448), at the base station, from the received second SRS, at least a second set of SRS values, each SRS value in the second set of SRS values corresponding to a different antenna, said SRS values in the second set of SRS values including a third SRS value corresponding to the first antenna; assign (454) (e.g., by a random or semi-random assignment process) at least some determined SRS values in the second set of SRS values to antennas to which the assigned SRS values from the second set of SRS values do not correspond; adjust (456) transmitter control values corresponding to different antennas based on the assigned at least some SRS values from the second set of SRS values; and operate the base station to transmit (458) a signal from said plurality of antennas to the first wireless terminal using the adjusted transmitter control values which were adjusted based on the assigned SRS values from the second set of SRS values (e.g., with the assigned values controlling transmission from at least some of said plurality of antennas).

Apparatus Embodiment 11. The base station of Apparatus Embodiment 10, wherein said processor is further configured to operate the base station to: receive (404) first channel state information from the first wireless terminal prior to receiving (410) the first SRS signal; and receive (438) second channel state information from the first wireless terminal after adjusting (426) the first transmitter control value corresponding to the first different antenna based on the assigned first SRS value, said second channel state information including at least some change from the first channel state information due to the adjusting of the first transmitter control value.

Apparatus Embodiment 12. The base station of Apparatus Embodiment 8, wherein said processor is further configured to: provide (442) said second channel state information to a scheduler; and operate (450) the scheduler to schedule transmissions to wireless terminals including said first wireless terminal based on at least some of said second channel state information.

Numbered List of Exemplary Non-Transitory Computer Readable Medium Embodiments

Non-Transitory Computer Readable Medium Embodiment 1. A non-transitory computer readable medium (510) including computer executable instructions which when executed by a processor (502) of a base station (500) (e.g. CBSD base station) cause to base station (500) to perform the steps of: receiving (410) a first Sounding Reference Signal (SRS) from a first wireless terminal (e.g. UE device being served by the base station) on each of a plurality of antennas; determining (412), at the base station, from the received first SRS, at least a first set of SRS values, each SRS value in the first set of SRS values corresponding to a different antenna, said SRS values including a first SRS value corresponding to a first antenna; assigning (418) (e.g., by a random or semi-random assignment process) at least some determined SRS values to antennas to which the assigned SRS values do not correspond; adjusting (424) transmitter control values corresponding to different antennas based on the assigned SRS values; and transmitting (432) a signal from said plurality of antennas to the first wireless terminal using the adjusted transmitter control values to control transmission from at least some of said plurality of antennas.

Various embodiments are directed to apparatus, e.g., network management nodes, access points (APs), e.g., WiFi APs, base stations such as NRU gNB base stations, etc., user devices such as stations (STAs), e.g., WiFi STAs, user equipment (UE) devices, LTE LAA devices, various types of RLAN devices, etc., other network communications devices such as routers, switches, etc., mobile network operator (MNO) base stations (macro cell base stations and small cell base stations) such as a Evolved Node B (eNB), gNB or ng-eNB, mobile virtual network operator (MVNO) base stations such as Citizens Broadband Radio Service Devices (CBSDs), network nodes, MNO and MVNO HSS devices, relay devices, e.g. mobility management entities (MMEs), a Spectrum Access System (SAS), an AFC system, an Access and Mobility Management Function (AMF) device, servers, customer premises equipment devices, cable systems, network nodes, gateways, cable headend and/or hubsites, network monitoring nodes and/or servers, cluster controllers, cloud nodes, production nodes, cloud services servers and/or network equipment devices. Various embodiments are also directed to methods, e.g., method of controlling and/or operating a network management node, access points (APs), e.g., WiFi APs, base stations such as NRU gNB base stations, etc., user devices such as stations (STAs), e.g., WiFi STAs, user equipment (UE) devices, LTE LAA devices, various types of RLAN devices, network communications devices such as routers, switches, etc., user devices, base stations, e.g., eNB and CBSDs, gateways, servers (HSS server), MMEs, SAS, an AFC system, cable networks, cloud networks, nodes, servers, cloud service servers, customer premises equipment devices, controllers, network monitoring nodes and/or servers and/or cable or network equipment devices. Various embodiments are directed to communications network which are partners, e.g., a MVNO network and a MNO network. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes and methods disclosed is an example of exemplary approaches. Based upon design preferences, it is understood that the specific order or hierarchy of steps in the processes and methods may be rearranged while remaining within the scope of the present disclosure. The accompanying method claims present elements of the various steps in a sample order and are not meant to be limited to the specific order or hierarchy presented. In some embodiments, one or more processors are used to carry out one or more steps of the each of the described methods.

In various embodiments each of the steps or elements of a method are implemented using one or more processors. In some embodiments, each of elements are steps are implemented using hardware circuitry.

In various embodiments nodes and/or elements described herein are implemented using one or more components to perform the steps corresponding to one or more methods, for example, message reception, message generation, signal generation, signal processing, sending, comparing, determining and/or transmission steps. Thus, in some embodiments various features are implemented using components or in some embodiment's logic such as for example logic circuits. Such components may be implemented using software, hardware or a combination of software and hardware.

Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g., a network management device, an access points (AP), e.g., WiFi AP, base stations such as NRU gNB base station, etc., a user device such as a station (STA), e.g., WiFi STA, a user equipment (UE) device, LTE LAA device, etc., an RLAN device, other network communications devices a network communications device such as router, switch, etc., a MVNO base station such as a CBRS base station, e.g., a CBSD, a device such as a cellular base station e.g., an eNB, a MNO HSS server, a MVNO HSS server, a UE device, a relay device, e.g. a MME, SAS, a AFC system, etc., said device including a processor configured to implement one, multiple or all of the steps of one or more methods of the invention.

In some embodiments, the processor or processors, e.g., CPUs, of one or more devices, e.g., a network management device, communications nodes such as e.g., access points (APs), e.g., WiFi APs, base stations such as NRU gNB base stations, etc., user devices such as stations (STAs), e.g., WiFi STAs, user equipment (UE) devices, LTE LAA devices, etc., various RLAN devices, network communications devices such as routers, switches, etc., a MVNO base station such as a CBRS base station, e.g. a CBSD, an device such as a cellular base station e.g., an eNB, a MNO HSS server, a MVNO HSS device server, a UE device, a relay device, e.g. a MME, a SAS, a AFC system, are configured to perform the steps of the methods described as being performed by the communications nodes, e.g., controllers. The configuration of the processor may be achieved by using one or more components, e.g., software components, to control processor configuration and/or by including hardware in the processor, e.g., hardware components, to perform the recited steps and/or control processor configuration.

Accordingly, some but not all embodiments are directed to a device, e.g., a network management device, an access points (AP), e.g., WiFi AP, a base station such as NRU gNB base station, etc., a user device such as station (STA), e.g., WiFi STA, a user equipment (UE) device, an LTE LAA device, etc., a RLAN device, a network communications device such as router, switch, etc., administrator device, security device, a MVNO base station such as a CBRS base station, e.g. a CBSD, an device such as a cellular base station e.g., an eNB, a MNO HSS server, a MVNO HSS device server, a UE device, a relay device, e.g. a MME, includes a component corresponding to each of one or more of the steps of the various described methods performed by the device in which the processor is included. In some but not all embodiments a device, e.g., a communications node such as e.g., network management device, an access points (AP), e.g., WiFi AP, a base station such as NRU gNB base station, etc., a user device such as a station (STA), e.g., WiFi STA, a user equipment (UE) device, a LTE LAA device, a RLAN device, a router, switch, etc., administrator device, security device, a AFC system, a MVNO base station such as a CBRS base station, e.g., a CBSD, a device such as a cellular base station e.g., an eNB, an MNO HSS server, a MVNO HSS device server, a UE device, a relay device, e.g. a MME, includes a controller corresponding to each of the steps of the various described methods performed by the device in which the processor is included. The components may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g., one or more steps described above.

Depending on the embodiment, the computer program product can, and sometimes does, include different code for each step to be performed. Thus, the computer program product may, and sometimes does, include code for each individual step of a method, e.g., a method of controlling a controller or node. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a network management node or device, a communications device such as a communications nodes such as e.g., an access point (AP), e.g., WiFi AP, a base station such as NRU gNB base station, etc., a user device such as a station (STA), e.g., WiFi STA, a user equipment (UE) device, a LTE LAA device, etc., an RLAN device, a network communications device such as router, switch, etc., administrator device, security device, a AFC system, MNVO base station, e.g., a CBSD, an MNO cellular base station, e.g., an eNB or a gNB, a HSS server, a UE device, a SAS or other device described in the present application. In some embodiments, components are implemented as hardware devices in such embodiments the components are hardware components. In other embodiments components may be implemented as software, e.g., a set of processor or computer executable instructions. Depending on the embodiment the components may be all hardware components, all software components, a combination of hardware and/or software or in some embodiments some components are hardware components while other components are software components.

Numerous additional variations on the methods and apparatus of the various embodiments described above will be apparent to those skilled in the art in view of the above description. Such variations are to be considered within the scope. Numerous additional embodiments, within the scope of the present invention, will be apparent to those of ordinary skill in the art in view of the above description and the claims which follow. Such variations are to be considered within the scope of the invention.

What is claimed is:

1. A method of operating a base station, the method comprising:
   receiving a first Sounding Reference Signal (SRS) from a first wireless terminal on each of a plurality of antennas, said plurality of antennas including a first antenna and a second antenna;
   determining, at the base station, from the received first SRS, at least a first set of SRS values, each SRS value in the first set of SRS values corresponding to a different antenna in said plurality of antennas, said SRS values including a first SRS value corresponding to a first antenna and being based on a measurement of the first SRS received on the first antenna;
   assigning one or more of the determined SRS values to antennas, in said plurality of antennas, to which the one or more of the determined SRS values do not correspond, said assigning including assigning the first SRS value to the second antenna, said second antenna being a different antenna from said first antenna;
   adjusting transmitter control values corresponding to different antennas based on the assigned SRS values, said adjusting transmitter control values including adjusting a first transmitter control value used to control transmission from the second antenna based on the assigned first SRS value; and
   transmitting a signal from said plurality of antennas to the first wireless terminal using the adjusted transmitter control values to control transmission from one or more of said plurality of antennas, said one or more of said plurality of antennas including said second antenna.

2. The method of claim 1, wherein the first and second antennas are polarized antennas.

3. The method of claim 1, wherein assigning one or more of the determined SRS values to antennas to which the assigned SRS values do not correspond includes:
   assigning a second SRS value corresponding to a third antenna to a fourth antenna, said second SRS value being different from said first SRS value, said fourth antenna being an antenna in said plurality of antennas which is not the third antenna and which is not the second antenna, to which the first SRS value is assigned;

wherein adjusting transmitter control values corresponding to different antennas based on the assigned SRS values includes:
adjusting a second transmitter control value used to control transmission from the fourth antenna based on the assigned second SRS value; and
wherein transmitting a signal from said plurality of antennas to the first wireless terminal includes:
transmitting a signal to the first wireless terminal from the fourth antenna in accordance with the second transmitter control value.

4. The method of claim 3, further comprising:
receiving channel state information (CSI) corresponding to each of said plurality of antennas prior to assigning one or more of the determined SRS values to antennas to which the assigned SRS values do not correspond.

5. The method of claim 4, wherein assigning one or more of the determined SRS values to antennas, in said plurality of antennas, to which the assigned SRS values do not correspond includes assigning SRS values to multiple antennas having a same channel quality.

6. The method of claim 3, wherein the first SRS value is an SRS value which occurs multiple times in said first set of SRS values; and
wherein the second SRS value is an SRS value which also occurs multiple times in said first set of SRS values.

7. The method of claim 6, wherein the second SRS value corresponds to a second type of antenna; and
wherein the fourth antenna is of the same antenna type as the second third antenna.

8. The method of claim 7, wherein the second type of antenna is a horizontally polarized antenna.

9. The method of claim 7, further comprising:
providing said second channel state information to a scheduler; and
operating the scheduler to schedule transmissions to wireless terminals including said first wireless terminal based on at least some of said second channel state information.

10. The method of claim 3, wherein the first SRS value corresponds to a first type of antenna; and
wherein the second antenna is of the same antenna type as the first antenna.

11. The method of claim 1, further comprising:
receiving a second Sounding Reference Signal (SRS) from the first wireless terminal on each of the plurality of antennas;
determining, at the base station, from the received second SRS, at least a second set of SRS values, each SRS value in the second set of SRS values corresponding to a different antenna in said plurality of antennas, said SRS values in the second set of SRS values including a third SRS value corresponding to the first antenna and being based on a measurement of the second SRS received on the first antenna;
assigning one or more determined SRS values in the second set of SRS values to antennas, in said plurality of antennas, to which the one or more determined SRS values in the second set of SRS values do not correspond;
adjusting transmitter control values corresponding to different antennas based on the assigned one or more determined SRS values in the second set of SRS values; and
transmitting a signal from said plurality of antennas to the first wireless terminal using the adjusted transmitter control values which were adjusted based on the assigned SRS values from the second set of SRS values.

12. The method of claim 11, further comprising:
receiving first channel state information from the first wireless terminal prior to receiving the first SRS signal; and
receiving second channel state information from the first wireless terminal after adjusting the first transmitter control value corresponding to the second antenna based on the assigned first SRS value, said second channel state information including at least some change from the first channel state information due to the adjusting of the first transmitter control value.

13. A base station comprising:
a plurality of antennas; and
a processor configured to:
operate the base station to receive a first Sounding Reference Signal (SRS) from a first wireless terminal on each of said plurality of antennas, said plurality of antennas including a first antenna and a second antenna;
determine, at the base station, from the received first SRS, at least a first set of SRS values, each SRS value in the first set of SRS values corresponding to a different antenna in said plurality of antennas, said SRS values including a first SRS value corresponding to a first antenna and being based on a measurement of the first SRS received on the first antenna;
assign one or more of the determined SRS values to antennas, in said plurality of antennas, to which the determined SRS values do not correspond, said assigning including assigning the first SRS value to the second antenna, said second antenna being a different antenna from said first antenna;
adjust transmitter control values corresponding to different antennas based on the assigned SRS values, said adjusting transmitter control values including adjusting a first transmitter control value used to control transmission from the second antenna based on the assigned first SRS value; and
operate the base station to transmit a signal from said plurality of antennas to the first wireless terminal using the adjusted transmitter control values to control transmission from one or more of said plurality of antennas, said one or more of said plurality of antennas including said second antenna.

14. The base station of claim 13, wherein said processor is further configured to:
assign a second SRS value corresponding to a third antenna to a fourth antenna, as part of being configured to assign one or more of the determined SRS values to antennas to which the assigned SRS values do not correspond, said second SRS value being different from said first SRS value, said fourth antenna being an antenna in said plurality of antennas which is not the third antenna and which is not the second antenna, to which the first SRS value is assigned;
adjust a second transmitter control value used to control transmission from the fourth antenna based on the assigned second SRS value, as part of being configured to adjust transmitter control values corresponding to different antennas based on the assigned SRS values; and
operate the base station to transmit a signal to the first wireless terminal from the fourth antenna in accordance with the second transmitter control value, as part of being configured to operate the base station to transmit a signal from said plurality of antennas to the first wireless terminal.

15. The base station of claim 14, wherein said processor is further configured to:
operate the base station to receive channel state information (CSI) corresponding to each of said plurality of antennas prior to assigning one or more of the determined SRS values to antennas to which the assigned SRS values do not correspond.

16. The base station of claim 15, wherein said processor is further configured to:
assign SRS values to multiple antennas having a same channel quality, as part of being configured to assign one or more of the determined SRS values to antennas, in said plurality of antennas, to which the assigned SRS values do not correspond.

17. The base station of claim 14, wherein the first SRS value is an SRS value which occurs multiple times in said first set of SRS values; and
wherein the second SRS value is an SRS value which also occurs multiple times in said first set of SRS values.

18. The base station of claim 13, wherein said processor is further configured to:
operate the base station to receive a second Sounding Reference Signal (SRS) from the first wireless terminal on each of the plurality of antennas;
determine, at the base station, from the received second SRS, at least a second set of SRS values, each SRS value in the second set of SRS values corresponding to a different antenna in said plurality of antennas, said SRS values in the second set of SRS values including a third SRS value corresponding to the first antenna and being based on a measurement of the second SRS received on the first antenna;
assign one or more determined SRS values in the second set of SRS values, in said plurality of antennas, to antennas to which the one or more determined SRS values in the second set of SRS values do not correspond;
adjust transmitter control values corresponding to different antennas based on the assigned one or more determined SRS values in the second set of SRS values; and
operate the base station to transmit a signal from said plurality of antennas to the first wireless terminal using the adjusted transmitter control values which were adjusted based on the assigned SRS values from the second set of SRS values.

19. A non-transitory computer readable medium including computer executable instructions which when executed by a processor of a base station cause to base station to perform the steps of:
receiving a first Sounding Reference Signal (SRS) from a first wireless terminal on each of a plurality of antennas, said plurality of antennas including a first antenna and a second antenna;
determining, at the base station, from the received first SRS, at least a first set of SRS values, each SRS value in the first set of SRS values corresponding to a different antenna in said plurality of antennas, said SRS values including a first SRS value corresponding to a first antenna and being based on a measurement of the first SRS received on the first antenna;
assigning one or more of the determined SRS values to antennas, in said plurality of antennas, to which the one or more of the determined SRS values do not correspond, said assigning including assigning the first SRS value to the second antenna, said second antenna being a different antenna from said first antenna;
adjusting transmitter control values corresponding to different antennas based on the assigned SRS values, said adjusting transmitter control values including adjusting a first transmitter control value used to control transmission from the second antenna based on the assigned first SRS value; and
transmitting a signal from said plurality of antennas to the first wireless terminal using the adjusted transmitter control values to control transmission from one or more of said plurality of antennas, said one or more of said plurality of antennas including said second antenna.

20. A method of operating a base station, the method comprising:
receiving a first Sounding Reference Signal (SRS) from a first wireless terminal on each of a plurality of antennas, said plurality of antennas including a first base station antenna and a second base station antenna;
determining, at the base station, from the received first SRS, at least a first set of SRS values, each SRS value in the first set of SRS values corresponding to a different antenna in said plurality of antenna, said SRS values including a first SRS value corresponding to the first base station antenna and being based on a measurement of the first SRS received on the first base station antenna;
assigning the first SRS value to the second base station antenna to which the first SRS value does not correspond;
adjusting a transmitter control value used to control transmission from the second base station antenna based on the first SRS value assigned to the second base station antenna; and
transmitting a signal from said plurality of antennas to the first wireless terminal, transmitting the signal including using the adjusted transmitter control value to control transmission from the second base station antenna.

* * * * *